United States Patent
Hong et al.

(10) Patent No.: US 11,848,779 B2
(45) Date of Patent: Dec. 19, 2023

(54) METHOD FOR DUPLICATELY RECEIVING CONTROL MESSAGE, AND DEVICE THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 49 days.

(21) Appl. No.: 16/489,468

(22) PCT Filed: Mar. 7, 2018

(86) PCT No.: PCT/KR2018/002686
§ 371 (c)(1),
(2) Date: Aug. 28, 2019

(87) PCT Pub. No.: WO2018/169242
PCT Pub. Date: Sep. 20, 2018

(65) Prior Publication Data
US 2019/0386779 A1 Dec. 19, 2019

(30) Foreign Application Priority Data

Mar. 16, 2017 (KR) .......................... 10-2017-0033375
Feb. 28, 2018 (KR) .......................... 10-2018-0024393

(51) Int. Cl.
*H04L 1/02* (2006.01)
*H04W 28/02* (2009.01)
(Continued)

(52) U.S. Cl.
CPC ................ *H04L 1/02* (2013.01); *H04L 5/001* (2013.01); *H04L 5/0094* (2013.01);
(Continued)

(58) Field of Classification Search
None
See application file for complete search history.

(56) References Cited

U.S. PATENT DOCUMENTS

2008/0089285 A1* 4/2008 Pirskanen ............. H04L 1/1621
370/329
2010/0182952 A1* 7/2010 Jeong ..................... H04L 1/189
370/328
(Continued)

FOREIGN PATENT DOCUMENTS

| KR | 10-2010-0122054 A | 11/2010 |
| WO | 2015/060544 A1 | 4/2015 |
| WO | 2016/053039 A1 | 4/2016 |

OTHER PUBLICATIONS

Ericsson, "Data duplication in lower layers (HARQ)", Tdoc R2-1702032, 3GPP TSG-RAN WG2 #97, Athens, Greece, Feb. 13-17, 2017, pp. 1-6.

*Primary Examiner* — Faruk Hamza
*Assistant Examiner* — Cassandra L Decker
(74) *Attorney, Agent, or Firm* — INVENSTONE Patent, LLC

(57) ABSTRACT

Provided is a method for a user equipment to duplicately receive an identical control messages. The method includes duplicately receiving identical control messages from a base station and processing the duplicately received identical control messages by mapping same to mutually different logical channels, by using identification information or an identification entity for identifying and processing the duplicately received identical control message.

20 Claims, 16 Drawing Sheets

(51) Int. Cl.
*H04L 5/00* (2006.01)
*H04W 16/32* (2009.01)
*H04W 76/15* (2018.01)
*H04L 1/08* (2006.01)
*H04L 1/00* (2006.01)

(52) U.S. Cl.
CPC ....... *H04W 16/32* (2013.01); *H04W 28/0252* (2013.01); *H04W 28/0263* (2013.01); *H04L 1/0072* (2013.01); *H04L 1/08* (2013.01); *H04L 5/0044* (2013.01); *H04W 76/15* (2018.02)

(56) References Cited

U.S. PATENT DOCUMENTS

| | | | | |
|---|---|---|---|---|
| 2010/0272006 | A1* | 10/2010 | Bertrand | H04B 7/2606 370/315 |
| 2011/0194428 | A1* | 8/2011 | Wang | H04W 72/005 370/312 |
| 2012/0057560 | A1 | 3/2012 | Park et al. | |
| 2012/0314637 | A1* | 12/2012 | Kim | H04L 1/1851 370/311 |
| 2014/0010192 | A1* | 1/2014 | Chang | H04L 5/0044 370/329 |
| 2014/0056243 | A1* | 2/2014 | Pelletier | H04W 72/1268 370/329 |
| 2015/0103793 | A1* | 4/2015 | Peng | H04W 76/15 370/329 |
| 2015/0124646 | A1* | 5/2015 | Yun | H04L 67/1051 370/254 |
| 2015/0271809 | A1* | 9/2015 | Kato | H04W 72/0413 370/329 |
| 2016/0050605 | A1* | 2/2016 | Kim | H04W 28/0819 370/331 |
| 2016/0057800 | A1* | 2/2016 | Ingale | H04L 5/0032 370/216 |
| 2016/0113058 | A1 | 4/2016 | Jung et al. | |
| 2016/0192376 | A1* | 6/2016 | Lee | H04W 48/20 370/252 |
| 2016/0234714 | A1* | 8/2016 | Basu Mallick | H04W 16/32 |
| 2016/0255619 | A1 | 9/2016 | Yi et al. | |
| 2017/0150384 | A1* | 5/2017 | Rune | H04W 72/085 |
| 2017/0196022 | A1* | 7/2017 | Yi | H04W 72/14 |
| 2017/0318532 | A1* | 11/2017 | Yi | H04W 76/27 |
| 2018/0084497 | A1* | 3/2018 | Jung | H04W 52/0225 |
| 2018/0132220 | A1* | 5/2018 | Jang | H04W 8/24 |
| 2018/0205808 | A1* | 7/2018 | Yang | H04L 45/00 |
| 2018/0270021 | A1* | 9/2018 | Ye | H04L 1/1819 |
| 2018/0316610 | A1* | 11/2018 | Lee | H04L 45/74 |
| 2019/0007983 | A1* | 1/2019 | Xiao | H04W 8/02 |
| 2019/0222474 | A1* | 7/2019 | Wittberg | H04L 1/08 |
| 2019/0253216 | A1* | 8/2019 | Zhang | H04B 7/0689 |
| 2020/0007274 | A1* | 1/2020 | Folke | H04W 74/004 |
| 2020/0015120 | A1* | 1/2020 | Lin | H04W 28/06 |
| 2020/0244424 | A1* | 7/2020 | Froberg Olsson | H04L 1/04 |

* cited by examiner

*FIG.2*

```
                          SRB configuration information
SRB-ToAddMod ::=    SEQUENCE {
    srb-Identity                        INTEGER (1..2),
    rlc-Config                          CHOICE {
        explicitValue                       RLC-Config,
        defaultValue                        NULL}               OPTIONAL,
    logicalChannelConfig                CHOICE {
        explicitValue                       LogicalChannelConfig,
        defaultValue                        NULL}               OPTIONAL,
    ...
}
```

FIG.5

SRB configuration information

```
SRB-ToAddMod ::=            SEQUENCE {
    srb-Identity                        INTEGER (1..2),
    rlc-Config                          CHOICE {
        explicitValue                       RLC-Config,
        defaultValue                        NULL}                   OPTIONAL,
    rlc-ConfigDuplicated                CHOICE {
        explicitValue                       RLC-Config,
        defaultValue                        NULL}                   OPTIONAL,
    logicalChannelConfig                CHOICE {
        explicitValue                       LogicalChannelConfig,
        defaultValue                        NULL}                   OPTIONAL,
    logicalChannelDuplicatedIdentity    INTEGER ()                  OPTIONAL,
    logicalChannelConfigDupliated       CHOICE {
        explicitValue                       LogicalChannelConfig,
        defaultValue                        NULL}                   OPTIONAL,
        ...
}
```

FIG.6

DRB configuration information

```
DRB-ToAddMod ::=          SEQUENCE {
    eps-BearerIdentity              INTEGER (0..15)         OPTIONAL,
    drb-Identity                    DRB-Identity,
    pdcp-Config                     PDCP-Config             OPTIONAL,
    rlc-Config                      RLC-Config              OPTIONAL,
    rlc-ConfigDuplicate             RLC-Config              OPTIONAL,
    logicalChannelIdentity          INTEGER (3..10)         OPTIONAL,
    logicalChannelConfig            LogicalChannelConfig    OPTIONAL,
    logicalChannelIdentityDuplicate INTEGER (3..10)         OPTIONAL,
    logicalChannelConfigDuplicate   LogicalChannelConfig    OPTIONAL,
}
```

FIG. 7

DRB configuration information

```
DRB-ToAddModDupplicate ::=       SEQUENCE {
    drb-Identity                     DRB-Identity,
    rlc-ConfigDuplicate              RLC-Config              OPTIONAL,
    logicalChannelIdentityDuplicate  INTEGER (3..10)         OPTIONAL,
    logicalChannelConfigDuplicate    LogicalChannelConfig    OPTIONAL,

DRB configuration information

```
DRB-ToAddMod ::=        SEQUENCE {
    eps-BearerIdentity            INTEGER (0..15)         OPTIONAL,
    drb-Identity                  DRB-Identity,
    pdcp-Config                   PDCP-Config             OPTIONAL,
    rlc-Configuration   ::= SEQUENCE {
            rlcIdentity           INTEGER (0..N)          OPTIONAL,
            rlc-Config            RLC-Config              OPTIONAL,
    }
    Logical-channelConfiguration ::=   SEQUENCE {
            logicalChannelIdentity       INTEGER (3..10)        OPTIONAL,
            logicalChannelConfig         LogicalChannelConfig   OPTIONAL,
    }
}
```

FIG.9

DRB configuration information

```
DRB-ToAddModDupplicate ::=    SEQUENCE {
    drb-Identity                 DRB-Identity,
    rlc-ConfigDuplicate          RLC-Config                OPTIONAL,
    logicalChannelConfigDuplicate LogicalChannelConfig     OPTIONAL,
    DuplicatedCell/Cellgroup     Cellindex/Celllist        OPTIONAL,
}
```

FIG.10

DRB configuration information

```
DRB-ToAddMod ::=      SEQUENCE {
    eps-BearerIdentity              INTEGER (0..15)         OPTIONAL,
    drb-Identity                    DRB-Identity,
    pdcp-Config                     PDCP-Config             OPTIONAL,
    rlc-Configuration        ::= SEQUENCE {
            rlcIdentity             INTEGER (0..N)          OPTIONAL,
            rlc-Config              RLC-Config              OPTIONAL,
    }
    Logical-channelConfiguration ::=   SEQUENCE {
            logicalChannelIdentity  INTEGER (3..10)         OPTIONAL,
            logicalChannelConfig    LogicalChannelConfig    OPTIONAL,
            rlcIdentity             INTEGER (0..N)          OPTIONAL,
    }
}
```

FIG.11

DRB configuration information

```
DRB-ToAddMod ::=          SEQUENCE {
    eps-BearerIdentity              INTEGER (0..15)         OPTIONAL,
    drb-Identity                    DRB-Identity,
    pdcp-Config                     PDCP-Config             OPTIONAL,
    rlc-Configuration ::=   SEQUENCE {
        rlcIdentity                 INTEGER (0..N)          OPTIONAL,
        rlc-Config                  RLC-Config              OPTIONAL,
        logicalChannelIdentity      INTEGER (3..10)         OPTIONAL,
    }
    Logical-channelConfiguration ::=   SEQUENCE {
        logicalChannelIdentity      INTEGER (3..10)         OPTIONAL,
        logicalChannelConfig        LogicalChannelConfig    OPTIONAL,
    }
}
```

METHOD FOR DUPLICATELY RECEIVING CONTROL MESSAGE, AND DEVICE THEREFOR

CROSS REFERENCE TO RELATED APPLICATIONS

This application is a National Stage Patent Application of PCT International Patent Application No. PCT/KR2018/002686 (filed on Mar. 7, 2018) under 35 U.S.C. §371, which claims priority to Korean Patent Application Nos. 10-2017-0033375 (filed on Mar. 16, 2017), and 10-2018-0024393 (filed on Feb. 28, 2018), the teachings of which are incorporated herein in their entireties by reference.

TECHNICAL FIELD

The present disclosure relates to a method and apparatus of duplicately transmitting control plane data through carrier aggregation, and to methods of a user equipment for receiving a control message duplicately through carrier aggregation based on a single base station and processing the duplicated control message, and apparatuses for implementing the methods.

BACKGROUND ART

As communication systems have been advanced, various types of wireless terminals have been introduced to consumers such as companies and individuals.

Lately, mobile communication systems have employed technologies related to 3rd generation partnership project (3GPP), such as long term evolution (LTE), LTE-Advanced, fifth generation (5G), or the like. Such mobile communication systems have been designed for transmitting and receiving a large amount of various data, such as video data, radio data, etc. at a high speed, beyond voice-oriented communication.

After LTE-Advanced, technologies for next generation radio access networks have been developed for enabling a user equipment to transmit and receive even more data and provide a higher quality of service (QoS). For example, development of a 5G network has been conducted by the 3GPP.

Meanwhile, a base station is able to configure a plurality of cells for increasing data transmission and reception rates of a user equipment and capabilities of the user equipment to transmit/receive data. For example, the base station and the user equipment configure carrier aggregation based on a plurality of carriers in order to satisfy user's demands.

In particular, in order to provide reliably a service with low latency, such as ultra-reliable and low-latency communications (URLLC), it is necessary for transmitting and receiving data without loss at an even higher speed. To this end, there is a demand for developing a technology for transmitting data duplicately using a plurality of cells, and at the same time, securing reliability to the related service.

However, when a 5G base station duplicately transmits a control message to a user equipment using a plurality of cells through a signaling radio bearer, it is necessary to identify the duplicated control message and processing the duplicated control message. However, a corresponding method has not been proposed or defined. Accordingly, it is not easy to satisfy requirements of the URLLC service that is one of key usage scenarios of 5G mobile communication technology.

DETAILED DESCRIPTION OF THE INVENTION

Technical Problem

It is at least one object of the present disclosure to provide a method and apparatus of a user equipment and a base station for configuring carrier aggregation and duplicately transmitting and receiving a control message using a plurality of cells through the carrier aggregation.

Technical Solution

To address the above issues, in accordance with one aspect of the present disclosure, a method of a user equipment is provided for duplicately receiving an identical control message through carrier aggregation. The method may include: duplicately receiving identical control messages from a base station through a plurality of carriers, and processing the duplicately received identical control messages by mapping the duplicately received identical control messages to different logical channels using duplication-identifying information or at least one duplication-related entity that enables the duplicately received identical control message to be identified and/or processed.

In accordance with another aspect of the present disclosure, a method of a base station is provided for duplicately transmitting an identical control message to a user equipment configured with carrier aggregation. The method may include configuring duplication-identifying information or at least one duplication-related entity for transmitting the identical control message by mapping the identical control message to different logical channels, and duplicately transmitting the identical control message to the user equipment using the duplication-identifying information or the at least one duplication-related entity through a plurality of carriers.

In accordance with further another aspect of the present disclosure, a user equipment is provided for duplicately receiving an identical control message through carrier aggregation. The user equipment may include a receiver configured to duplicately receive the identical control message from a base station through a plurality of carriers, and a controller configured to process the duplicately received identical control messages by mapping the duplicately received identical control messages to different logical channels using duplication-identifying information or at least one duplication-related entity that enables the duplicately received identical control messages to be identified and/or processed.

In accordance with yet another aspect of the present disclosure, a base station is provided for duplicately transmitting an identical control message to a user equipment configured with carrier aggregation. The base station may include: a controller configured to generate duplication-identifying information or to set at least one duplication-related entity for transmitting the identical control message by mapping the identical control message to different logical channels, and a transmitter configured to duplicately transmit the identical control message to the user equipment using the duplication-identifying information or the at least one duplication-related entity through a plurality of carriers.

Effects of the Invention

In accordance with embodiments of the present disclosure, it is possible to provide advantages of enabling a user equipment (or a base station) rapidly and accurately to transmit control messages to or receive a control message from the base station (or the user equipment) for providing services requiring high reliability and low latency.

Further, in accordance with embodiments of the present disclosure, it is possible to provide a method of enabling a user equipment for duplicately receiving control messages, identifying the duplicated control messages, and processing the duplicated control message.

BRIEF DESCRIPTION OF THE DRAWINGS

FIG. 2 is a diagram illustrating an example of typical signaling radio bearer configuration information.

FIG. 5 is a diagram illustrating signaling radio bearer configuration information according to embodiments of the present disclosure.

FIG. 6 is a diagram illustrating data radio bearer configuration information according to one embodiment of the present disclosure.

FIG. 7 is a diagram illustrating data radio bearer configuration information according to another embodiment of the present disclosure.

FIG. 8 is a diagram illustrating data radio bearer configuration information according to further another embodiment of the present disclosure.

FIG. 9 is a diagram illustrating data radio bearer configuration information according to still another embodiments of the present disclosure.

FIG. 10 is a diagram illustrating data radio bearer configuration information according to yet another embodiment of the present disclosure.

FIG. 11 is a diagram illustrating data radio bearer configuration information according to further still another embodiment of the present disclosure.

BRIEF DESCRIPTION OF THE DRAWINGS

Figure 1:
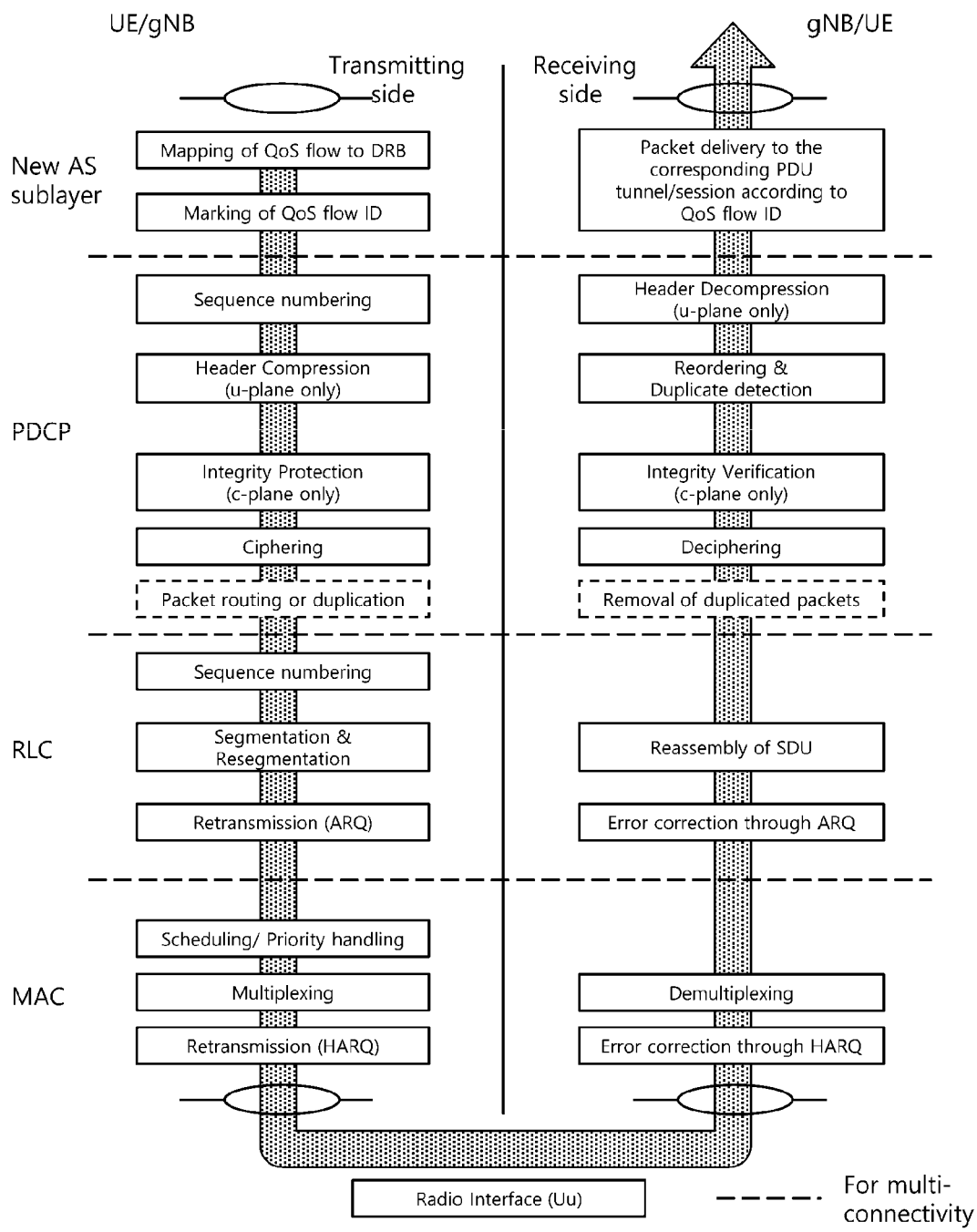
FIG. 1 is a diagram illustrating an example of a layer 2 structure for a new radio access technology (New RAT).

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a machine type communication (MTC) terminal may refer to a terminal supporting low cost (or low complexity), a terminal supporting coverage enhancement, or the like. The MTC terminal may refer to a terminal supporting low cost (or low complexity), a terminal supporting coverage enhancement, and the like. The MTC terminal may refer to a terminal classified into a predetermined category for supporting low cost (or low complexity) and/or coverage enhancement.

In other words, the MTC terminal herein may refer to a low cost (or low complexity) user equipment category/type newly defined in 3GPP Release-13 and performing LTE-based MTC-related operations. The MTC terminal may refer to a user equipment category/type defined in or before 3GPP Release-12, which supports enhanced coverage in comparison with the typical LTE coverage or supports low power consumption. Or, the MTC device may refer to a low cost (or low complexity) user equipment category/type newly defined in Release-13.

In the present disclosure, a wireless communication system is widely deployed to provide various communication services, such as a voice communication service, a packet data service, etc. The wireless communication system includes a user equipment (hereinafter, referred to as "UE") and a base station (BS, or eNB). In the present disclosure, the UE is defined as a generic term referring to terminals used in wireless communications. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, the base station or the cell is defined as a generic term including, but not limited to, as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms a communication service area, such as a megacell, a macrocell, a microcell, a picocell, a femtocell, or a small cell, and provides a communication service within the communication service area or 2) a communication service area. In the case of 1), the base station may be referred to i) apparatuses controlled by the same entity for forming a corresponding communication service area and providing a communication service within the corresponding communication service area or ii) apparatuses interacting and cooperating with each other for forming the corresponding communication service area and providing the communication service within the corresponding communication service area. According to communication schemes employed by a base station, the base station may be referred to as an eNB, a RRH, an antenna, a RU, a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (hereinafter, referred to as "UL") refers to data transmission/reception by a UE to/from a base station, and the downlink (hereinafter, referred to as "DL") refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. An embodiment of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, under the related standard, in some systems such as the LTE system or the LTE-advanced system, the UL and the DL are configured based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be a base station or macrocell (hereinafter, referred to as 'eNB') and at least one remote radio head (RRH) that is connected to the eNB through an optical cable or an optical fiber and thereby controlled in a wired manner, and that has high transmission power or low transmission power in the macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission/reception of a signal through a channel such as the PUCCH, the PUSCH, the PDCCH, or the PDSCH, may be described as transmission/reception of the channel, such as the PUCCH, the PUSCH, the PDCCH, or the PDSCH.

In addition, hereinafter, a description of transmitting or receiving a PDCCH or a description of transmitting or receiving a signal through the PDCCH may be used as meaning including transmitting or receiving an EPDCCH or transmitting or receiving a signal through the EPDCCH.

That is, a physical DL control channel described below may mean the PDCCH or the EPDCCH, or is also used as meaning including both the PDCCH and the EPDCCH.

Also, for convenience of description and ease of understanding, an EPDCCH may be applied to an embodiment described with the PDCCH, as an embodiment of the present disclosure, and the PDCCH may be also applied to an embodiment described with the EPDCCH as an embodiment.

Meanwhile, higher layer signaling described below includes radio resource control (RRC) signaling transmitting RRC information containing an RRC parameter.

The eNB performs DL transmission to UEs. The eNB may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be described in such a manner that a corresponding channel is transmitted/received.

An enhanced mobile broadband (eMBB), massive machine-type communication (mMTC), and ultra-reliable and low latency communication (URLLC) are proposed as representative usage scenarios for NR having been discussed in the 3GPP recently.

\*

In the present disclosure, a frequency, a frame, a subframe, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

For example, in the present disclosure, the LTE and the NR denote different radio access technologies, and the term "NR as used herein refers to a new radio access technology under discussion in Release-15 of the 3GPP. The NR may include various differences compared with the LTE, such as a different frame structure, channel, core network technology, or the like, and may additionally include wireless transmission in a high band, transmission of a large volume of data or transmission of data in high speed.

Hereinafter, for convenience of description and ease of understanding, typical radio access technologies are referred to as the LTE, and the new radio access technology under discussion in the 3GPP is referred to as the NR. A base station may be an eNB employing the LTE technology or a gNB employing the NR technology, and one of the eNB and the gNB will be used, when needed.

A cell is used as a generic term including, but not limited to, a radio path, a radio link, a carrier, or the like, for transmitting data, and one base station may transmit/receive data using a plurality of cells. A UE may transmit/receive data using a plurality of cells through each cell controlled by each of two base stations. As described below, the using of a plurality of cells controlled by one base station is described as carrier aggregation, and the using of a plurality of cells controlled by two or more base stations is described as dual connectivity.

LTE Dual Connectivity Operation

The typical LTE technology supports dual connectivity for enabling a UE simultaneously to use two base station radio resources. A dual connectivity operation enables a multiple RX/TX UE in an RRC connected state to use radio resources which are connected to two base stations connected through non-ideal backhaul and which are provided by two different schedulers located in each base station.

In case the dual connectivity is configured, a UE may transmit/receive data through a plurality of cells provided by a plurality of base stations. Hereinafter, a primary base station is referred to as a Master eNB (MeNB) and an additional base station is referred to as a secondary eNB (SeNB).

To provide a radio resource of a SeNB to a UE, a SeNB addition procedure is used in the SeNB for establishing a UE context.

NR (New Radio)

Recently, the 3GPP has carried out a "Study on New Radio Access Technology" (hereinafter, for convenience of description, referred to as a new radio or "NR"). The NR provides a new AS sublayer over PDCP for providing flow-based QoS.

FIG. 1 is a diagram illustrating an example of a layer 2 structure for a new radio access technology (New RAT).

As shown in FIG. 1, key services and functions of the new AS sublayer are as follows.

Mapping between a QoS flow and a data radio bearer; Marking QoS flow ID in both DL and UL packets.

The new user plane protocol layer is applicable for connections to a next generation core (NextGen Core). A single protocol entity of the new user plane protocol layer is configured for each individual PDU session.

For architecture for the NR and a requirement for migration, it is necessary for RAN architecture to support tight interworking between the NR and the LTE. LTE dual connectivity is expected to be reused for the tight interworking between the NR and the LTE. Further, the dual connectivity technology may be used between NR base stations in the NR. Dual connectivity in the NR environment may be defined as multi-connectivity. For example, the multi-connectivity may be defined as a mode of operation whereby a multiple Rx/Tx UE in the connected mode is configured to utilize radio resources amongst E-UTRA and/or NR provided by multiple distinct schedulers connected via non-ideal backhaul.

Meanwhile, the NR may be built even in a high frequency band (e.g., a high frequency of 6 GHz or more). In this case, there are possibilities of sharp SINR drops due to link blockage and high transmission loss in the high frequency band. This may result in undesired latency and reduced reliability, when an NR base station transmits control plane RRC messages or user plane data through an interface between the NR and an NR UE. In particular, these problem make it difficult to provide a service requiring high reliability and low latency, such as the URLLC service.

As an example of addressing such issues, duplicate transmission of a control plane RRC message through one or more radio paths may be taken into account in order to provide RRC diversity. As another example, duplicate transmission of user plane data through one or more radio paths may be taken into account based on multi-connectivity.

Duplicate Transmission Based on a Single Base Station

In order to increase a data transmission rate and a data transmission amount, carrier aggregation (hereinafter, referred to as "CA") is introduced into the NR. For example, a UE may transmit data through a plurality of cells based on the CA configured by a single base station. Hereinafter, the cell is used for discussing data transmission related to the CA; however, embodiments of the present disclosure are not limited thereto. For example, instead of the cell, a radio path, a radio link, a carrier, or the like, may be used as a similar meaning or a substantial equal meaning, if necessary. That is, in the present disclosure, the terms of the radio path, the radio link, the carrier, the cell, and the like, may be used to denote a data path provided by a base station for data transmission to and data reception from a UE.

When the CA is configured for a UE by a single base station, the UE may perform duplicate transmission through one or more cells. For example, the UE may be allowed to transmit duplicately a control plane RRC message through one or more cells. As another example, the UE may duplicately transmit user plane data through one or more cells. However, no procedures and technical details have been defined or provided for performing duplicate transmission using the CA. In particular, in the case of a signaling radio bearer in the typical LTE-based mobile communication technology, a base station and a user equipment were not able to distinguish the signaling wireless bearer into two logical channels and perform transmission based on two distinguished logical channels. Similarly, in the case of a data radio bearer, a base station and a user equipment were not able to distinguish the data radio bearer into two logical channels ad perform transmission through two distinguished logical channels.

As described above, in a radio access network, duplicate transmission through two or more radio paths may be taken into account as a method for reliably providing a service such as the URLLC with low latency. However, when the CA is configured for a UE based on a single base station, it was not able to transmit through a plurality of radio paths resulted from associating one signaling radio bearer or one data radio bearer with a plurality of logical channels.

To address such issues, in accordance with embodiments of the present disclosure, when the CA is configured for a UE based on a single base station, a method and an apparatus are provided for establishing a radio bearer in implementing a duplicate transmission function for reliably providing a service such as the URLLC with low latency. Further, a method is provided for effectively controlling a plurality of transmission cells based on the CA.

Embodiments of the present disclosure may be applied to any radio access (e.g., the LTE) networks and UEs, as well as next generation mobile communication (for example, 5G mobile communication/NR) UEs.

The base station herein may denote i) an eNode-B of LTE/E-UTRAN or an LTE base station, or ii) an NR node, a central unit (CU), a distribute unit (DU) in the 5G radio network that is split into the CU and the DU, or iii) a gNodeB or an NR base station in which the CU and the DU form one logical entity. Hereinafter, for convenience of description and ease of understanding, the base station is represented by the NR base station, but all these entities are included in the scope of the present disclosure.

Following scenarios may be considered in NR-LTE.
In case CA is configured based on one or more NR cells and one or more LTE cells provided through an LTE base station
In case CA is configured based on one or more NR cells and one or more LTE cells provided through an NR base station
In case CA is configured based on one or more NR cells provided through an NR base station
In case CA is configured based on one or more LTE cells provided through an LTE base station Hereinafter, for convenience of description and ease of understanding, the CA will be described to be configured based on one or more NE cells provided by the NR base station. This is just for convenience of description and ease of understanding, and therefore other CA scenarios are included in the scope of the present disclosure. Further, embodiments of the present disclosure may include a situation where dual connectivity is configured for a UE while the CA is configured based on one or more LTE cells and one or more NR cells provided by an LTE base station and an NR base station, respectively. For example, while dual connectivity is configured based on one of i) LTE-NR dual connectivity in which an LTE base station is a master base station and an NR base station is a secondary base station, ii) NR-LTE dual connectivity in which an NR base station is a master base station and an LTE base station is a secondary base station, or iii) NR-NR dual connectivity in which an NR base station is a master base station and another NR base station is a secondary base station, a situation where duplicate transmission is performed using CA configured by a corresponding single base station may be included in embodiments of the present disclosure. That is, embodiments of the present disclosure may include, while the dual connectivity is configured by a plurality of base stations employing different radio access technologies or a plurality of NR base stations, a situation where the CA is configured by one of the base stations or the NR base stations.

The NR base station may control an NR radio resource of a corresponding UE. The NR base station may perform one or more control functions among addition/modification/release/management of an NR cell/cell group/transmission point/transmission point group/transmission and reception point/transmission and reception point group/TRP/antenna/antenna group/beam (hereinafter, referred to as "cell"), NR measurement, NR measurement reporting, NR resource allocation, addition/correction/release of an NR radio bearer, NR radio resource configuration, and NR mobility control. The NR base station may instruct the one or more control functions to the UE through an RRC configuration message or an RRC reconfiguration message.

The CA may be configured for the UE by the NR base station through one or more cells.

The NR base station may perform data duplicate transmission based on CA using a PDCP duplicate function.

A PDCP entity of the base station duplicates or copies PDCP PDUs (or PDCP SDUs) having an identical sequence number (SN) for duplicately transmitting data through one or more radio cells, and submits the duplicated or copied PDCP PDUs (or PDCP SDUs) to a lower layer(s).

The PDCP entity of the UE receives the PDCP PDUs (or PDCP SDUs) received through one or more radio cells. For example, the PDCP entity may process the first received data and discard the duplicate data. As another example, a function of detecting and discarding the duplicate data may be performed by the PDCP entity. For example, a transmitting side may transmit data having an identical PDCP SN through two paths, and a receiving side may detect the duplicate data based on the PDCP SN (or may discard the detected data after detecting). The base station may provide configuration information for indicating or processing such an operation to the UE.

For UL transmission, the PDCP entity of the UE duplicates or copies PDCP PDUs (or PDCP SDUs) having an identical sequence number (SN) for duplicately transmitting data through one or more radio cells and submits the duplicated or copied PDCP PDUs (or PDCP SDUs) to a lower layer(s).

The PDCP entity of the base station receives the PDCP PDUs (or PDCP SDUs) received through one or more radio cells. For example, the PDCP entity may process the first received data and discard the duplicate data. As another example, a function of detecting and discarding duplicate data may be performed by the PDCP entity. For example, a transmitting side may transmit data having an identical PDCP SN through two paths, and a receiving side may detect the duplicate data based on the PDCP SN (or discard the detected data after detecting). The base station may provide configuration information for indicating or processing such an operation to the UE.

Duplicate data transmission for user plane data may be processed in a PDCP layer connected through a new AS sublayer. In the case of an RRC message, related duplicate data transmission may or may not be processed through the new AS sublayer.

For example, the duplicate data transmission for the RRC message may be processed in the PDCP through the new AS sublayer. As another example, the duplicate data transmission for the RRC message may be processed in the PDCP by directly being connected without the new AS sublayer.

Hereinafter, for convenience of description and ease of understanding, although control message duplicate reception will be described to be performed through a signaling radio bearer; however, control message duplicate transmission through the signaling radio bearer, user data duplicate reception through a data radio bearer, and user data duplicate transmission through the data radio bearer are included in the embodiments of the present disclosure as well.

Further, hereinafter, for convenience of description and ease of understanding, it is assumed that two logical channels are used when one or more logical channels are desired to be used for duplicately transmitting data that belong to one signaling radio bearer or one data radio bearer based on the CA. This is merely for convenience of description and ease of understanding, and therefore, using two or more logical channels is also included in embodiments of the present disclosure. In the case of two or more logical channels or logical channels above two, two or more logical channels may be identified using one of a sequence, a list, identification information, or an index.

FIG. 2 is a diagram illustrating an example of typical signaling radio bearer configuration information.

Referring to FIG. 2, for signaling radio bearer identification information (srb-Identity) in a typical signaling radio bearer (SRB), a value 1 is applicable for SRB1 only and a value 2 is applicable for SRB2 only. RLC configuration information is explicitly signaled or set to a default value specified in the 3GPP RRC TS document. RLC AM is the only applicable RLC mode for the SRB1 and the SRB2.

Thus, in the typical technology, the logical channel identifier of the SRB1 is fixed to 1 and the logical channel identifier of the SRB2 is fixed to 2. Accordingly, it is unnecessary for a base station to inform this to a UE. When data duplicate transmission is desired to be provided based on a single base station for the SRB, it was not able to transmit duplicately the corresponding data through two or more logical channels and process duplicately the received data.

To address such issues, hereinafter, embodiments of a UE and a base station for differently processing a duplicate control message for the signaling radio bearer will be described.

Figure 3:
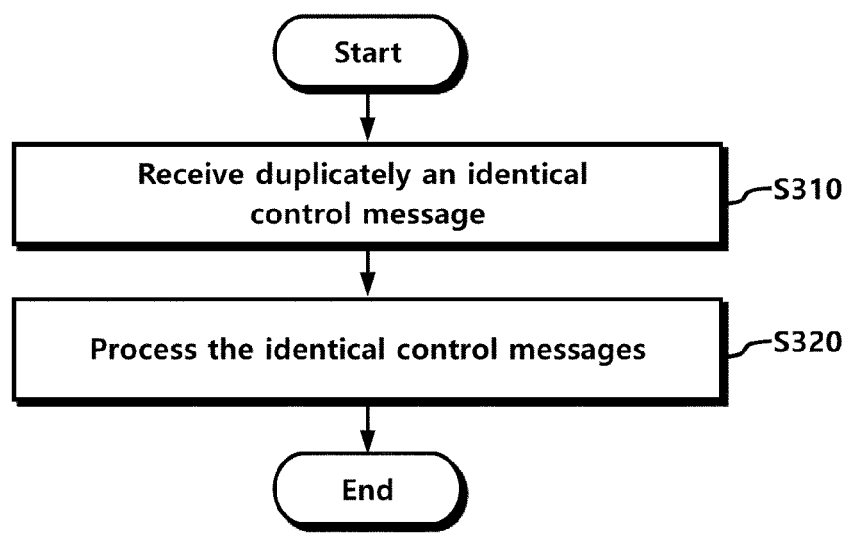
FIG. 3 is a flow diagram illustrating operation of a user equipment according to embodiments of the present disclosure.

FIG. 3 is a flow diagram illustrating operation of a UE according to embodiments of the present disclosure.

Referring to FIG. 3, the UE may duplicately receive identical control messages through a plurality of carriers from a base station, at step S310.

For example, the UE may configure carrier aggregation using a plurality of carriers (cells) supplied by a single base station and duplicately receive control messages through the aggregated carriers. For example, the UE may receive a control message through a first cell and receive the identical control message through a second cell. There is no limitation to the number of aggregated carriers or cells aggregated for configuring the carrier aggregation.

Further, using duplication-identifying information or at least one duplication-related entity for enabling the duplicately received identical control messages differently to be processed, the UE may map the duplicately received identical control messages to different logical channels and process them, at step S320. In the disclosure, an entity may denote a hardware component, such as a circuitry module or a processor for performing related operations in control of a main processor. Such an entity may be implemented as a part of the main processor or as an independent circuitry or an independent processor. However, the embodiments are not limited thereto. An entity may denote a software component for performing certain operations.

When a duplicate transmission function is configured by a base station, respective logical channels that belong to one radio bearer are required to be associated with or mapped to one or more exclusive cells. That is, it is necessary for duplicately transmitting data from the PDCP through different cells. Similarly, the UE may map identical control messages that have duplicately received through different carriers to different logical channels and thus process them. That is, the PDCP entity of the UE may select only one of identical control messages received by being mapped to different logical channels, the other(s) of which is discarded, and then transfer the selected control message to a higher layer. To do this, it is necessary to define operation of the UE for transferring duplicately received control messages through different carriers up to the PDCP entity through different logical channels. To this end, the UE may use duplication-identifying information or at least one duplication-related entity.

For example, the UE may process duplicately received control messages using the duplication-identifying information.

The duplication-identifying information may include logical channel configuration information including two logical channel identification information mapped to corresponding signaling radio bearers. For example, when a control message is duplicately received, using the logical channel configuration information, the UE may process the received control messages using respective logical channel identification information. In this case, a MAC entity of the UE may use predefined logical channel identification information, which is already allocated to the signaling radio bearer, to one control message, and use one or more newly defined logical channel identification information to other one or more control messages that are duplicately received.

As another example, the MAC entity of the UE may use predefined logical channel identification information, which is already allocated to the signaling radio bearer, to one control message, and use one or more logical channel identification information of a data radio bearer to other one or more control messages that are duplicately received.

As further another example, the duplication-identifying information may include additional information for identifying logical channels mapped to respective control messages that are duplicately received. For example, the additional information may be included in a medium access control (MAC) PDU sub-header, or be included in an additional field or a predefined field of the MAC PDU sub-header. As another example, the additional information may be included using an additional field or a predefined field in a header or data of radio link control (RLC). As further another example, the additional information may be included in one or more identifying bits that are additionally set to the logical channel identification information. For example, when the logical channel identification information is configured with 5 bits, 4 bits of the logical channel identification information that is already predefined may be maintained, and 1 bit of the 5 bits may be used as a bit indicating whether it is a duplicate control message.

The UE may process received control messages using the at least one duplication-related entity.

For example, the at least one duplication-related entity may be a plurality of medium access control (MAC) entities configured to process differently respective identical control messages received duplicately. The plurality of MAC entities may be configured, set, or controlled by an instruction of a base station, and may be configured for respective carriers. Therefore, duplicate control messages may be processed differently through the MAC entities corresponding to respective carriers.

As another example, the at least one duplication-related entity may be a plurality of radio link control (RLC) entities configured to process differently the respective identical control messages received duplicately. For example, at least one of the plurality of RLC entities may be a data radio bearer RLC entity. One or more added data radio bearer RLC entities may be configured in a UE by being associated with logical channel identification information different from logical channel identification information of a predefined signaling radio bearer, and one or more duplicate control messages may be transferred to the PDCP entity through the one or more added RLC entities.

In addition, the UE may process control messages duplicately received through in combinations with one or more embodiments of the duplication-identifying information described above and/or one or more embodiments of the duplication-related entity described above.

Each embodiment of using the duplication-identifying information or the at least one duplication-related entity as described above, will be discussed in detail with reference to FIG. 5 to FIG. 14.

Figure 4:
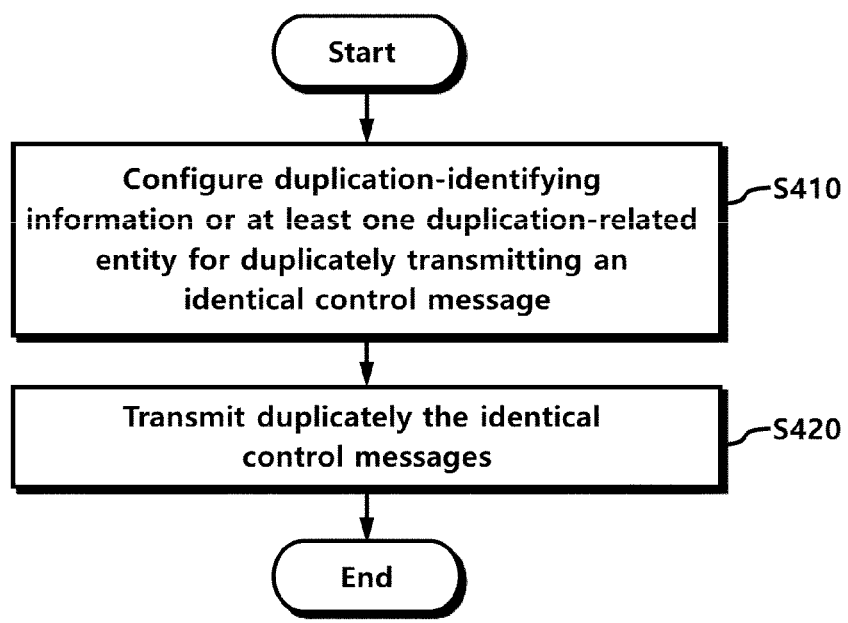
FIG. 4 is a flow diagram illustrating operation of a base station according to embodiments of the present disclosure.

FIG. 4 is a flow diagram illustrating operation of a base station according to embodiments of the present disclosure.

Referring to FIG. 4, a base station may configure or generate duplication-identifying information or set or configure at least one duplication-related entity for mapping an identical control message to different logical channels and then duplicately transmitting it through the different logical channels, at step S410.

When a duplicate transmission function is configured by the base station, respective logical channels that belong to one radio bearer are required to be associated with or mapped to one or more exclusive cells. That is, it is necessary for duplicately transmitting data from the PDCP through different cells. To do this, the base station may set or configure the duplication-identifying information or the duplication-related entity and duplicately transmit a control message to a UE through different carriers using the duplication-identifying information or the duplication-related entity.

For example, the base station may duplicately transmit a control message using the duplication-identifying information.

The duplication-identifying information may include logical channel configuration information including two logical channel identification information mapped to one signaling radio bearer. For example, when a control message is duplicately transmitted using the logical channel configuration information, the base station may process the respective control messages using logical channel identification information different from one another. In this case, the base station may use predefined logical channel identification information, which is already allocated to the signaling radio bearer, to one control message, and use one or more newly defined logical channel identification information to other one or more control messages that are duplicately transmitted.

As another example, the base station may apply predefined logical channel identification information, which is already allocated to the signaling radio bearer, to one control message, and apply one or more logical channel identification information of a data radio bearer to other one or more control messages that are duplicately transmitted.

As further another example, the duplication-identifying information may include additional information for identifying logical channels mapped to respective control messages that are duplicately transmitted. For example, the additional information may be included in a medium access control (MAC) PDU sub-header, or be included in an additional field or a predefined field of the MAC PDU sub-header. As another example, the additional information may be included using an additional field or a predefined field in a header or data of radio link control (RLC). As further another example, the additional information may be included in one or more identifying bits that are additionally set to the logical channel identification information. For example, when the logical channel identification information is configured with 5 bits, 4 bits of the logical channel identification information that is already predefined may be maintained, and 1 bit of the 5 bits may be used as a bit indicating whether it is a duplicate control message.

The base station may process a control message to be duplicately transmitted using the duplication-related entity. For example, the duplication-related entity may be a plurality of medium access control (MAC) entities configured to process duplicately an identical control message to be transmitted duplicately. The plurality of MAC entities may be configured for respective carriers.

As another example, the duplication-related entity may be a plurality of radio link control (RLC) entities configured to process duplicately transmitted identical control message. For example, at least one of the plurality of RLC entities may be a data radio bearer RLC entity. The duplicate control message may be transferred to a UE through one or more added RLC entities.

The base station may duplicately transmit an identical control message to the UE through a plurality of carriers using the duplication-identifying information and the at least one duplication-related entity, at step S420.

For example, the base station may process identical control messages resulted from copying in a PDCP entity using the duplication-identifying information or the duplication-related entity, and transmit them to the UE through a plurality of carriers.

In addition, the base station may duplicately transmit a control message through in combinations with one or more embodiments of the duplication-identifying information described above and/or one or more embodiments of the duplication-related entity described above.

Hereinafter, the embodiments and examples of duplicately transmitting/receiving an identical control message described with reference to FIG. 3 and FIG. 4 will be discussed in detail for each embodiment. A base station and a UE are configured to duplicately transmit/receive data using one or more NR cells provided through the CA for each of embodiments described below or in combination with one or more other embodiments described below.

The duplication-identifying information means information for identifying different logical channels in first to fifth embodiments to be described below, and the at least one duplication-related entity means one or more MAC entities or one or more RLC entities in sixth and seventh embodiments to be described below.

Embodiment 1: A Method of Dedicating New Logical Channel Identification Information (LCID) to One or More Added Logical Channels for a Signaling Radio Bearer Logical channel identification information included in a MAC header is represented as a logical channel ID (LCID).

The LCID has a value of 00000 for SRB0 (or CCCH in the LTE), a value of 00001 (integer 1) for SRB1, and a value of 00010 (integer 2) for SRB2.

For duplicate transmission, one or more logical channels may be configured for one signaling radio bearer (SRB). As an example for identifying the logical channels, a logical channel (hereinafter, referred to as a second logical channel) having an LCID value different from a logical channel (hereinafter, referred to as a first logical channel) having a predefined LCID value may be defined for one signaling radio bearer over a MAC entity. Dedication of a specific LCID value may enable the second logical channel to be identified as a logical channel for the SRB.

As an example, one of values (01100 (integer 12)-10100 (integer 20)) that have been reserved among UL-SCH LCID values and/or values (01011 (integer 11)-10111 (integer 23)) that have been reserved among DL-SCH LCID values in the LTE may be dedicated to be used as an LCID of one or more logical channels for duplicate transmission of a signaling radio bearer. As another example, one of 01100 (integer 12)-10100 (integer 20), which is the intersection of an UL-SCH and a DL-SCH, may be dedicated to be used as an LCID of one or more logical channels for duplicate transmission of a signaling radio bearer.

As another example, one of values (01100-10100) that have been reserved among UL-SCH LCID values and/or values (01011-10111) that have been reserved among DL-SCH LCID values in the LTE may be dedicated to be used as an LCID of one or more second logical channels added to the SRB1.

As further another example, one of values (01100-10100) that have been reserved among UL-SCH LCID values and/or values (01011-10111) that have been reserved among DL-SCH LCID values in the LTE may be dedicated to be used as an LCID of one or more second logical channels added to the SRB2.

For example, the base station may provide, to a UE, an LCID for identifying the second logical channel over a MAC entity. As another example, it may be unnecessary for the base station to provide, to a UE, an LCID for identifying the second logical channel over a MAC entity as the LCID is fixed.

Embodiment 2: A Method of Using an LCID of a Data Radio Bearer to One or More Added Logical Channels for a Signaling Radio Bearer Logical channel identification information included in a MAC header is represented as the LCID. The LCID has a value of 00000 for SRB0 (or CCCH in the LTE), a value of 00001 for SRB1, and a value of 00010 for SRB2.

For duplicate transmission, one or more logical channels may be configured for one signaling radio bearer (SRB). As an example for identifying the logical channels, a logical channel (hereinafter, referred to as a second logical channel) having an LCID value different from a logical channel (hereinafter, referred to as a first logical channel) having a predefined LCID value may be defined for one signaling radio bearer over a MAC entity. The second logical channel is for duplicate transmission.

The first logical channel may be transmitted by being identified as a signaling radio bearer.

For example, as in the embodiments described above, the second logical channel may be transmitted by being identifying as a signaling radio bearer over a second cell/cell group.

As another example, the second logical channel may be transmitted by using a logical channel value assigned to a data radio bearer (DRB) over a second cell/cell group. One or more LCIDs (00011 (integer 3)-01010 (integer 10)) of the data radio bearer may be used for this purpose. Through logical channel configuration information of a logical channel using one or more LCIDs of the data radio bearer, a base station may assign a configuration information parameter (priority, prioritisedBitrate, buceketSizeDuration, logicalChannelGroup) of the logical channel as a specific value or a higher priority. Through this, a UE is able to recognize that the logical channel is for a signaling radio bearer or process the recognized logical channel at the higher priority. Alternatively, through a new parameter/indicator in logical channel configuration information of a logical channel using one or more LCIDs of the data radio bearer, the base station may enable the UE to recognize that the logical channel is for a signaling radio bearer.

FIG. 5 is a diagram illustrating signaling radio bearer configuration information according to embodiments of the present disclosure.

As another example, using the example of signaling radio bearer configuration information as shown in FIG. 5, a base station may inform of a UE, an LCID for identifying a second logical channel over a MAC entity.

Embodiment 3: A Method of Providing Additional Information for Identifying a Second Logical Channel A base station may provide, to a UE, additional information for identifying a first logical channel and a second logical channel that both belong to one signaling radio bearer.

For example, data belonging to each logical channel may be identified by using a new field even when the first logical channel and the second logical channel have an identical LCID.

The LCID may be used for logical channel identification information included in a MAC header. The LCID has a value of 00000 for SRB0 (or CCCH in the LTE), a value of 00001 for SRB1, and a value of 00010 for SRB2.

As an example, the first logical channel and the second logical channel that belong to one signaling radio bearer may have one or more identical LCIDs. For example, SRB0 (or CCCH in the LTE) may have a value of 00000, SRB1 may have a value of 00001, and SRB2 may have a value of 00010. However, information for identifying the first logical channel and the second logical channel may be added in a MAC header for enabling differently processing of the first logical channel and the second logical channel for a MAC SDU/PDU having an identical LCID in a MAC entity of the UE or a MAC entity of the base station.

A typical MAC PDU header is formed of one or more MAC PDU sub-headers. Each MAC PDU subheader is made up of one MAC SDU, one MAC control element and optional padding.

As an example, a typical MAC PDU subheader is formed of the five or six header fields R/F2/E/LCID/(F)/L but for the last subheader in the MAC PDU and for fixed sized MAC control elements. However, the last subheader in the MAC PDU and subheaders for fixed sized MAC control elements is made solely of the four header fields R/F2/E/LCID. Here, the L is a length field indicating the length of the corresponding MAC SDU, the F or F2 is a format field indicating the size of the length field, the E is an extension field indicating if more fields are present in the MAC header or not, the R is a reserved bit and set to "0". A logical channel of a signaling radio bearer for duplicate transmission in the MAC header/subheader may be identified by adding a new field (e.g., when 1 bit is used, 0 indicates a first logical channel, and 1 indicates a second logical channel) in the MAC PDU subheader. Further, a specific value of a predefined field may be dedicated for identifying such a logical channel, or a first logical channel and a second logical channel which both belong to one signaling radio bearer may be identified using a method of defining a new MAC subheader.

Embodiment 4: A Method of Identifying by Adding 1 Bit in the LCID Bit

The typical LCID bit is formed of 5 bits. A first logical channel and a second logical channel which both belong to one signaling radio bearer may be identified by adding 1 bit to the LCID formed of 5 bits.

Using the bits resulted from the adding, a base station and a UE are able to identify a first logical channel and a second logical channel which belong to one signaling radio bearer.

The base station may provide, to the UE, LCID information for identifying a first logical channel and a second logical channel that belong to one signaling radio bearer. Alternatively, when the corresponding information is configured in advance in the UE, it may be unnecessary for the base station to indicate this to the UE.

As an example, the first logical channel and the second logical channel have the same LCID as the predefined LCID formed of 5 bits, but it is possible to identify data belonging to respective logical channels through the added 1 bit (e.g., when 1 bit is used, 0 indicates a first logical channel, and 1 indicates a second logical channel.)

Embodiment 5: A Method of Including Information for Identifying a Logical Channel for Duplicate Transmission in an RLC Header or a Specific Part of RLC Data A base station may provide, to a UE, additional information for identifying a first logical channel and a second logical channel that belong to one signaling radio bearer. Alternatively, the base station may provide, to a UE, additional information for identifying, in an RLC layer, a first logical channel and a second logical channel that belong to one signaling radio bearer.

Hereinafter, one signaling radio bearer will be described as supporting duplicate transmission through two RLC entities. When a primary RLC entity associated with one signaling radio bearer is referred to as a first RLC entity, and an RLC entity added for duplicate transmission is referred to as a second RLC entity, a MAC entity may be able to identify the first logical channel and the second logical channel using information included in an RLC PDU. Hereinafter, an RLC entity for duplicate transmission is referred to as the second RLC entity. This term is just for convenience of description and ease of understanding, and therefore other terms are included in the scope of the present disclosure. For example, any term may be available, such as a second RLC entity different from the first RLC entity configured for one signaling radio bearer, or the like.

As an example, when the first logical channel and the second logical channel use an identical logical channel identifier, or even when a logical channel identifier is not used, the MAC entity is able to identify data of respective logical channels through information for identifying a logical channel for duplicate transmission included in an RLC header or a specific part of RLC data. The duplicate transmission may be performed by identifying a first cell/cell group and a second cell/cell group through this.

As another example, when the first logical channel and the second logical channel use an identical logical channel identifier, or even when a logical channel identifier is not used, the MAC entity may transmit, to the first RLC entity, data received through the first cell/cell group through information for identifying a logical channel for duplicate transmission included in an RLC header or a specific part of RLC data.

As another example, when the first logical channel and the second logical channel use an identical logical channel identifier, or even when a logical channel identifier is not used, the MAC entity may transmit, to the second RLC entity, data received through the second cell/cell group through information for identifying a logical channel for duplicate transmission included in an RLC header or a specific part of RLC data.

As another example, the MAC entity may transfer data received using an identical logical channel identifier to the first RLC entity. The first RLC entity may receive data associated with the first logical channel and data associated with the second logical channel, and transfer the data associated with the second logical channel to the second RLC entity.

As further another example, information for identifying the logical channel may be included in the RLC header. As further another example, information for identifying the logical channel may be included in a predefined portion of RLC data, such as a front portion or a rear portion, enabling the MAC layer to identify data using this.

Embodiment 6: A Method of Configuring Identifiable MAC Entities

A base station may instruct a UE to configure two MAC entities in the UE for identifying a first logical channel and a second logical channel that belong to one signaling radio bearer and map the logical channels to the associated MAC entities, respectively. In order for the two MAC entities to be configured in the UE, and data duplicate transmission to be performed through the two logical channels, it is necessary for the base station to create or establish a MAC entity for the duplicate transmission. (For convenience of description, it is referred to as a second MAC entity. That is, a MAC entity added for the duplicate transmission based on a single base station is referred to as the second MAC entity.).

Unlike a SCG MAC entity configured by a base station (e.g., a secondary base station) independent from a master base station based on dual connectivity, the second MAC entity configured by the single base station may perform a MAC procedure by enabling the corresponding base station directly to use the two MAC entities efficiently. The base station may efficiently configure specific configuration information.

For example, each of the first MAC entity and the second MAC entity may perform all or a part of MAC procedures independently from each other. Since the second MAC entity is used for reliable duplicate transmission rather than efficiency, the second MAC entity may perform all or a part of the MAC procedure independently from the first MAC entity. Such MAC procedures may be one or more of a buffer state report (BSR), a scheduling request (SR), a logical channel prioritization (LCP), or a power headroom report (PHR).

As another example, the MAC procedure may be performed by coordination between the first MAC entity and the second MAC entity. Although the second MAC entity is used for reliable duplicate transmission rather than efficiency, it may be more efficient for some MAC procedures to be performed through the coordination. Such MAC procedures may be one or more of a BSR, a SR, an LCP, a PHR, or a DRX.

As another example, the first MAC entity may provide all or most parts of the MAC procedure occurring in the two MAC entities, and the second MAC entity may perform some restricted functionalities. For example, the second MAC entity may perform at least one of a function of associating data transmitted/received from the second RLC entity that belongs to one radio bearer with a logical channel, a routing function related to this, and a function of adding/removing information for identifying this in a data header. For example, the LCP may be performed only in the first MAC entity. For example, the first MAC entity may trigger the BSR or the SR in consideration of both a logical channel in the first MAC entity and a logical channel in the second MAC entity. The BSR transmitted by the first MAC entity to the base station may include a logical channel of the second MAC entity.

As another example, the two MAC entities are used for enabling the UE to identify the two logical channels, and all or a part of MAC procedures may be performed by any MAC entity which is instructed by the base station or previously designated. For example, the two MAC entities are used for enabling the UE to identify the two logical channels, and all or a part of MAC procedures may enable each MAC entity to support one or more efficient MAC procedures through coordination of the MAC procedures. For example, the PHR procedure may be provided differently from dual connectivity PHR.

As another example, the two MAC entities are used for enabling the UE to identify the two logical channels, and the first MA entity or the second MAC entity may trigger duplicately (or simultaneously) all or a part of the MAC procedures. For example, each MAC entity may trigger the BSR and the SR. Each MAC entity may perform the LCP.

As another example, the two MAC entities are used for enabling the UE to identify the two logical channels, and the first MAC entity only may trigger all or a part of the MAC procedures. For example, the first MAC entity may trigger the BSR and the SR. The first MAC entity may be allowed to trigger the BSR or the SR in consideration of both a logical channel in the first MAC entity and a logical channel in the second MAC entity. The BSR transmitted by the first MAC entity to the base station may include a logical channel of the second MAC entity.

As another example, to reduce power consumption of the UE, DRX configuration information (onDurationTimer, drx-InactivityTimer, drx-RetransmissionTimer, longDRX-CycleStartOffset) or one or more of the DRX configuration information for the two MAC entities may be indicated using an identical value. For example, each MAC entity may be formed of an identical drx parameter. As another example, each MAC entity may be formed of one drx parameter. As another example, each MAC entity may be configured to have a certain relationship (e.g., a proportional relationship) with one or more drx parameters. As another example, each MAC entity may be configured to be operated through an identical drx parameter value. As another example, the first MAC entity may discontinuously monitor a PDCCH received through a cell associated with the first MAC entity and/or a cell associated with the second MAC entity through one drx. As another example, a drx parameter is configured only in the first MAC entity, and only the first MAC entity may discontinuously monitor a PDCCH received through a cell associated with the first MAC entity and/or a cell associated with the second MAC entity through this drx parameter.

As another example, radio link monitoring (RLM) has been supported in the typical dual connectivity. However, it is unnecessary to support the RLM for a second cell/cell group based on a single base station.

As another example, cross carrier scheduling was not supported between an MCG and a SCG in the typical dual connectivity. However, it is unnecessary to impose such a limitation for a second cell/cell group based on a single base station. Accordingly, the base station may enable cross carrier scheduling for the second cell/cell group to be supported through a first cell/cell group. For example, to support this, the cross carrier scheduling may include information for identifying a MAC entity in RRC configuration information. The information for identifying the MAC entity may be included in DL control information (DCI). As another example, predefined cross carrier scheduling configuration information (CrossCarrierSchedulingConfig) may include scheduling cell identification information (schedulingCellId) and information (cif-InSchedulingCell) indicating a carrier indicator field (CIF) used for indicating a cell to be scheduled in a scheduling cell. However, unlike the dual connectivity, there is no limitation to the cross carrier scheduling between the first cell group and the second cell group. For example, a cell of the first cell group may be a scheduling cell, and a cell of the second cell group may be a scheduled cell.

As another example, the second cell group may include a PUCCH SCell. The cell included in the second cell group may be configured with a SCell providing a PUCCH through the PUCCH SCell.

As another example, the second cell group may include the PUCCH SCell. The cell included in the second cell group may be configured by including, as well as a SCell providing a PUCCH through the PUCCH SCell, a SCell providing the PUCCH through a PCell.

Embodiment 7: A Method of Additionally Configuring an RLC Entity for Duplicate Transmission A base station may configure an additional RLC entity for duplicate transmission in a UE. (For convenience of description, hereinafter, the additional RRL entity is referred to as "second RLC entity." This term is just for convenience of description and ease of understanding, and therefore other terms are included in the scope of the present disclosure. For example, any term may be used, such as a second RLC entity different from the first RLC entity configured for one signaling radio bearer)

The base station may configure CA for a UE having a single connection to one base station. Through this, the UE may transmit data to or receive data from the single base station through a plurality of radio paths. The base station may indicate related configuration information to the UE. For example, the base station may configure one or more RLC entities mapped to one data radio bearer (DRB) for the UE. The one or more RLC entities may be one or more RLC entities different from an SCG RLC entity provided for a split bearer in the typical dual connectivity. That is, the one or more RLC entities may be an RLC entity included in a typical (or added for a master cell group (MCG)) DRB configuration information (DRB-ToAddModSCG) different from an RLC entity included in DRB configuration information (DRB-ToAddModSCG) added for a secondary cell group (SCG). Alternatively, the one or more RLC entities may be an RLC entity included in cell group configuration information (CellGroupConfig) added for an MCG different from an RLC entity included in cell group configuration information (CellGroupConfig) added for a SCG.

FIG. 6 is a diagram illustrating data radio bearer configuration information according to an embodiment of the present disclosure.

As shown in FIG. 6, configuration information for a radio bearer providing duplicate transmission may include information associated with an RLC entity, logical channel identification information, and logical channel configuration information for the duplicate transmission for one SRB or DRB. Through this, for the duplicate transmission, the second RLC entity may be associated with and mapped to a second logical channel.

FIG. 7 is a diagram illustrating data radio bearer configuration information according to another embodiment of the present disclosure.

As shown in FIG. 7, configuration information for a radio bearer providing duplicate transmission may include at least one of radio bearer identification information, an RLC entity, logical channel identification information, and logical channel configuration information for the duplicate transmission for one SRB or DRB. Through this, for the duplicate transmission, the second RLC entity may be associated with and mapped to a second logical channel. The RLC entity or the logical channel identification information for the duplicate transmission may be associated with one radio bearer configured in a UE through the radio bearer identification information. Alternatively, the RLC entity or the logical channel identification information for the duplicate transmission may be associated with one radio bearer configured in a UE by being included in PDCP configuration information.

FIG. 8 is a diagram illustrating data radio bearer configuration information according to a further another embodiment of the present disclosure.

As shown in FIG. 8, configuration information for a radio bearer providing duplicate transmission may be associated with and include RLC configuration information and logical channel configuration information used for the duplicate transmission for one SRB or DRB. In the case of two or more RLC configurations, two or more RLC entities may be identified using one of a sequence, a list, identification information, and an index.

For example, the RLC configuration information may include RLC identification information for identifying RLC entities. The RLC identification information may be configured to include up to 2 or 4 RLC identification information. As another example, the RLC identification information may be represented by information (BOOLEAN) for identifying RLC entity for the duplicate transmission. When the RLC identification information have an integer value, the smallest value (for example, 0) may be a primary RLC entity (first RLC entity). For example, identification information of one RLC entity may be set as a value identical to logical channel identification information (logical channel identifier). As another example, data radio bearer configuration information may be allowed to include mapping information or a mapping rule for mapping the RLC entity to logical channel information. As another example, information associated with the RLC entity and logical channel identification information is identified through a sequence, and the information identified by the sequence may be included in the logical channel configuration information.

FIG. 9 is a diagram illustrating data radio bearer configuration information according to a still another embodiment of the present disclosure.

As shown in FIG. 9, configuration information for a radio bearer for duplicated transmission may include i) information associated with one or more of RLC configuration information, ii) logical channel configuration information, and iii) duplicate transmission cell/cell group configuration information used for the duplicate transmission for one SRB or DRB to be identified through a sequence. Through this, for one SRB or DRB, each of two RLC entities, and each of two logical channels may be configured to be associated with each other in a UE.

For example, in the MAC, first logical channel data received by associated information between a first cell group and a first logical channel may be transferred to the first RLC entity. As another example, the first logical channel data received by the first RLC entity may be transferred through the first cell group by the associated information between the first cell group and the first logical channel in a MAC entity. As another example, in the MAC entity, second logical channel data received by associated information between a second cell group and a second logical channel may be transferred to the second RLC entity. As another example, the second logical channel data received by the second RLC entity may be transferred through the second cell group by the associated information between the second cell group and the second logical channel in the MAC entity. As another example, the MAC entity may transfer, to the second RLC entity, logical channel data of a corresponding radio bearer received through the second cell group through associated information between the second cell group and the second RLC entity. As another example, the MAC entity may transfer, to the first RLC entity, logical channel data of a corresponding radio bearer received through the first cell group through associated information between the first cell group and the first RLC entity. As another example, the MAC entity may transfer, to the first cell group, logical channel data of a corresponding radio bearer received through the first RLC entity through associated information between the first cell group and the first RLC entity. As another example, the MAC entity may transfer, to the second cell group, logical channel data of a corresponding radio bearer received through the second RLC entity through associated information between the second cell group and the second RLC entity.

Through this, duplicate transmission may be performed through associations between the cell groups and the RLC entities.

FIG. 10 is a diagram illustrating data radio bearer configuration information according to a yet another embodiment of the present disclosure. FIG. 11 is a diagram illustrating data radio bearer configuration information according to a further still another embodiment of the present disclosure.

As shown in FIG. 10 or FIG. 11, radio bearer configuration information may include information for identifying and mapping each of one or more RLC entities to each of one or more logical channels, used for the duplicate transmission, for one SRB or DRB.

A UE may perform duplicate transmission when additional RLC configuration information is configured by a base station, or when the additional RLC configuration information is configured and data duplicate is activated.

A PDCP entity (e.g., PDCP circuitry or PDCP processor) of the base station duplicates or copies PDCP PDUs (or PDCP SDUs) having an identical sequence number (SN) for duplicately transmitting data through one or more radio cells, and then submits the duplicated or copied PDCP PDUs (or PDCP SDUs) to a lower layer(s). A PDCP entity (e.g., PDCP circuitry of PDCP processor) of the UE receives the PDCP PDUs (or PDCP SDUs) received through one or more radio cells. For example, the PDCP entity (e.g., PDCP circuitry or processor) may process data received first and discard duplicate data.

The PDCP entity of the UE duplicates or copies PDCP PDUs (or PDCP SDUs) having an identical sequence number (SN) for duplicately transmitting data through one or more radio cells, and then submits the duplicated or copied PDCP PDUs (or PDCP SDUs) to a lower layer(s). The PDCP entity of the base station receives the PDCP PDUs (or PDCP SDUs) received through one or more radio cells.

When the duplicate transmission is not activated (or a condition for activation is not satisfied), the PDCP entity of the base station submits the PDCP PDUs to a first RLC entity, for DL transmission. If not, the PDCP entity of the base station submits the PDCP PDUs to the first RLC entity and a second RLC entity.

When the duplicate transmission is not activated (or a condition for activation is not satisfied), the PDCP entity of the UE submits the PDCP PDUs to a first RLC entity, for UL transmission. If not, the PDCP entity of the UE submits the PDCP PDUs through the first RLC entity and a second RLC entity.

For DL reception, the UE receives data by PDCP duplicate based on a single base station through a plurality of carriers. A MAC entity (e.g., MAC circuitry or MAC processor) of the UE transfers the received data to a higher layer (RLC) based on logical channel identification information. That is, the MAC entity of the UE transfers the received data to an RLC entity based on the logical channel identification information. In the typical technology, since one logical channel of the MAC entity and one RLC entity have been defined for one radio bearer, data therefore have been allowed to be transferred to the corresponding RLC entity based on logical channel identification information included in a MAC header. However, when one or more RLC entities and one or more logical channels are defined for one radio bearer, it may be required to provide a mapping relationship between the RLC entities and the logical channels.

Through this, the MAC entity of the UE may transfer corresponding data to each corresponding RLC entity based on each logical channel identification information. To do this, the base station is needed to enable mapping information between each RLC entity and each logical channel to be configured for the UE. For example, this may be provided by combining one or more of the Embodiments or examples described above with reference to FIG. 6 to FIG. 11. As another example, this may be provided through various Embodiments or examples described above.

For UL transmission, the UE transmits data through a plurality of carriers by the PDCP duplicate based on a single base station. The PDCP entity (e.g., PDCP circuitry or PDCP processor) of the UE duplicates or copies PDCP PDUs (or PDCP SDUs) having an identical sequence number (SN) for duplicately transmitting data through one or more radio cells, and then submits the duplicated or copied PDCP PDUs (or PDCP SDUs) to a lower layer(s). For example, the PDCP entity duplicates or copies PDCP PDUs (or PDCP SDUs) having an identical sequence number (SN) and then submits the duplicated or copied PDCP PDUs (or PDCP SDUs) to one or more RLC entities. This may be provided based on one PDCP entity configuration information and configuration information of one or more RLC entities that belong to one radio bearer. For example, this can be performed by mapping based on an identical radio bearer identifier (e.g., DRB-identity). Each RLC entity transfers the PDUs (or SDUs) from the PDCP entity to a MAC entity. For example, when one or more MAC entities are used, RLC entities transfers an RLC PDU to associated MAC entities, respectively.

As another example, when one MAC entity is used, related operations will be performed as follows. For example, each RLC entity transfers a corresponding RLC PDU to the MAC entity. The MAC entity may generate a MAC PDU based on logical channel identification information associated with the corresponding RLC entity. RLC entity configuration information is needed to be mapped to the associated logical channel configuration information. This may be provided by combining one or more of the Embodiments or examples described above with reference to FIG. 6 to FIG. 11.

This may be provided by defining and mapping logical channel identification information and RLC entity identification information, and/or defining and mapping logical channel identification information and RLC entity indexes. As another example, RLC entity indexes (or RLC identification information) may be configured to be equal to the logical channel identification information. As another example, when two RLC entities and two logical channels are configured, a second RLC entity can be mapped to a second logical channel for one radio bearer.

Hereinafter, various structures of a UE and a base station for data duplication transmission will be described. First, the data duplication transmission using two MAC entities will be described. As an example, a dual/multi connectivity based split bearer structure may be reused for duplicately transmitting data between a single base station and a UE through one or more cells based on the CA.

Figure 12:
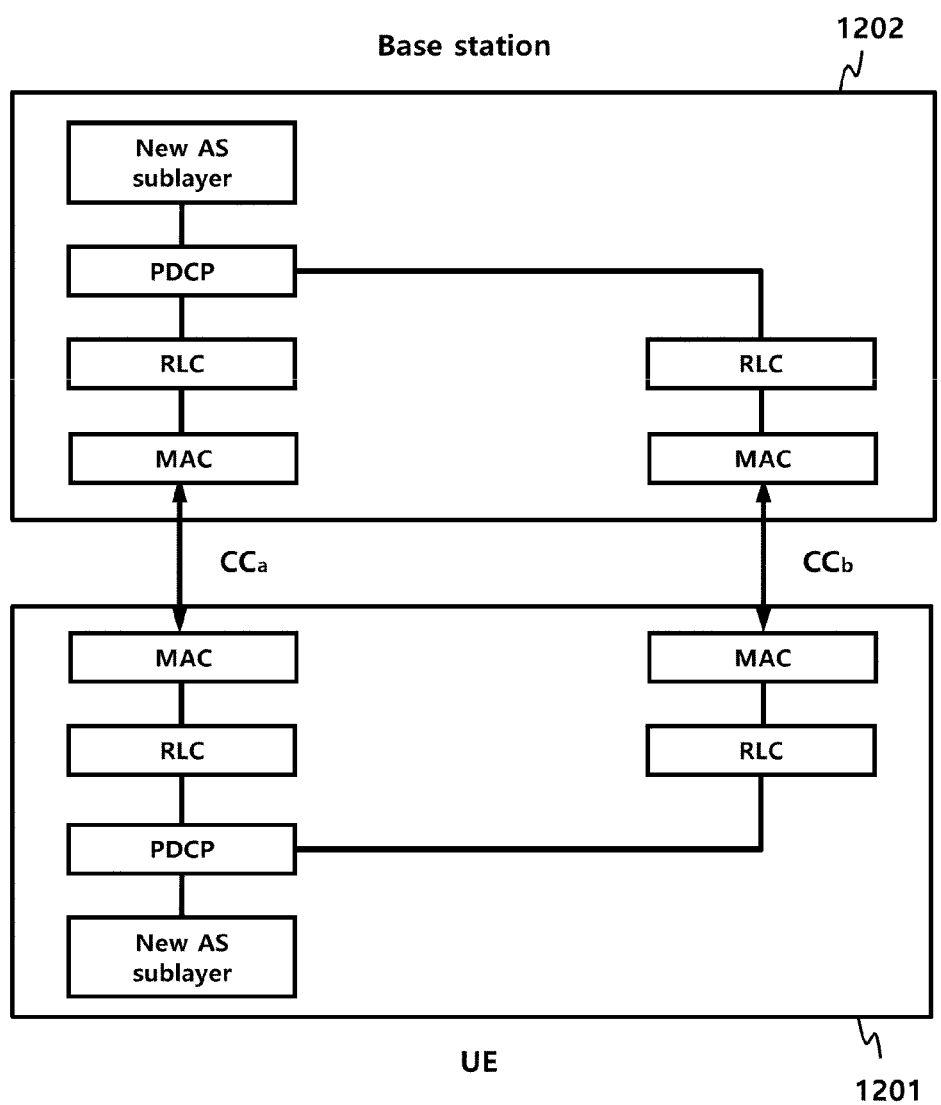
FIG. 12 is a diagram illustrating data duplicate transmission based on carrier aggregation in accordance with one embodiment.
Figure 13:
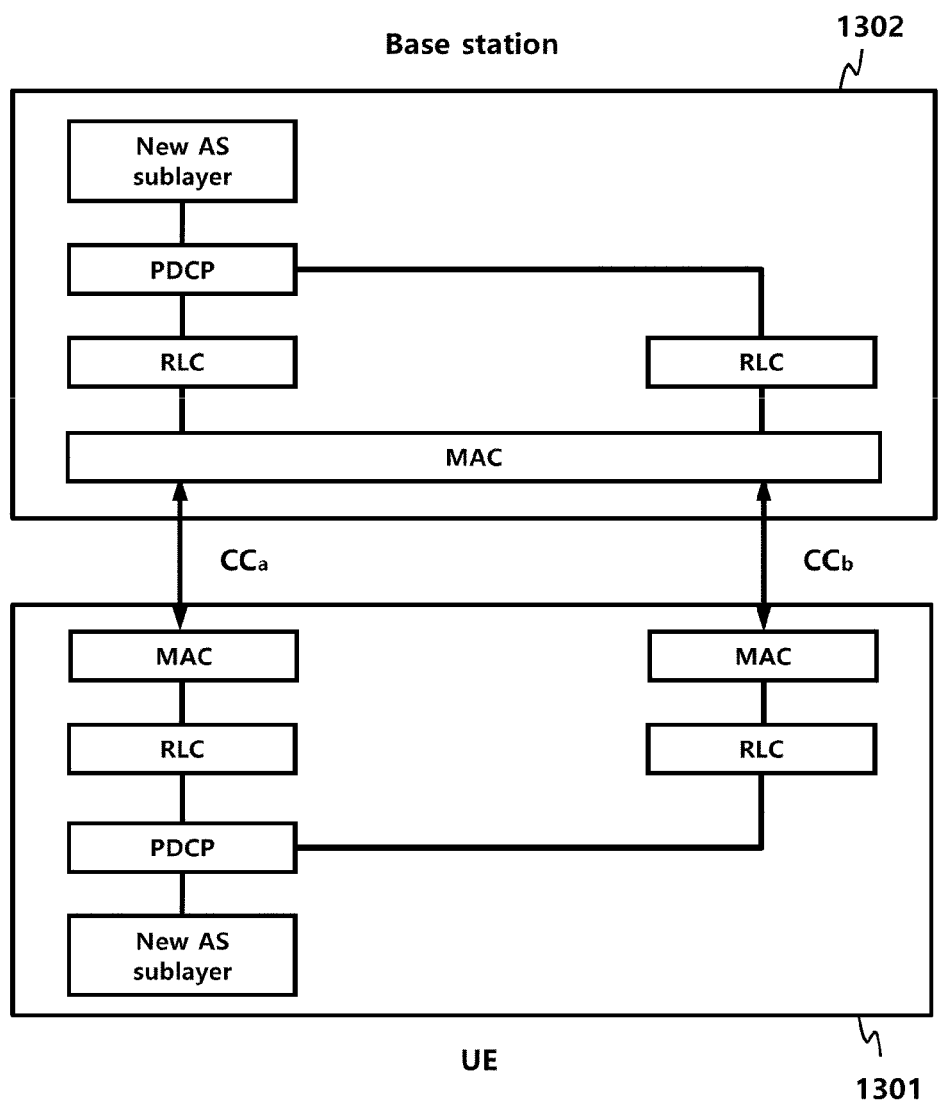
FIG. 13 is a diagram illustrating data duplicate transmission based on carrier aggregation in accordance with another embodiment.

FIG. 12 is a diagram illustrating data duplicate transmission based on carrier aggregation in accordance with one embodiment of the present disclosure. FIG. 13 is a diagram illustrating data duplicate transmission based on carrier aggregation in accordance with another embodiment of the present disclosure.

Referring to FIG. 12 and FIG. 13, a UE 1201 or 1301 may be configured to transmit data duplicately using two MAC entities (e.g., MAC circuitries or MAC processors) of the UE 1201 or 1301 through one or more carriers provided through the CA. In the disclosure, an entity may denote a hardware component, such as a circuitry module or a processor for performing related operations in control of a main processor. Such an entity may be implemented as a part of the main processor or as an independent circuitry or an independent processor. However, the embodiments are not limited thereto. An entity may denote a software component for performing certain operations.

For example, the UE 1201, 1301 uses a second MAC entity when receiving an RRC (reconfiguration) message including configuration information indicating single base station (1202, 1302) CA-based duplicate transmission.

Unlike a SCG MAC entity configured by a base station (secondary base station) independent from a master base station based on dual connectivity, the second MAC entity configured by the single base station may be configured by directly efficiently setting configuration information for two MAC entities by the base station specific. Each MAC entity may identify logical channels associated with respective RLC entities that belong to one radio bearer. Alternatively, each MAC entity may include one or more carriers.

When a data duplicate function is configured, at least one of carriers (or cells) associated with each MAC entity is required to be activated in order to perform the duplicate transmission.

For example, when configuring data duplicate function, a base station may configure one or more cells associated with a second MAC entity to be in an activation state.

As another example, when configuring the data duplicate function, the base station may define and indicate one or more cells associated with the second MAC entity as a specific cell different from other Scell(s). It should be noted that this specific cell may not be needed to provide a function of transmitting a PUCCH.

As another example, when configuring the data duplicate function, the base station may configure the specific cell associated with the second MAC entity to be always in an activation state.

As another example, when configuring the data duplicate function, the base station may configure a cell associated with the second MAC entity to be in a deactivation state. For activating the data duplicate function, a base station may activate one or more (or a specific cell) of cells associated with the second MAC entity. A deactivation timer provided to a Scell may not be applicable to the corresponding cell.

As another example, when configuring the data duplicate function, the base station may configure a cell configured in the second MAC entity to be in a deactivation state. The base station may activate the data duplicate function only when one or more of cells configured in the second MAC entity are activated.

As another example, when configuring the data duplicate function, the base station may configure a cell in association with the second MAC entity to be in a deactivation state. When configuring (or activating) the data duplicate function, the base station may enable one or more of cells in association with the second MAC entity not to be deactivated. Alternatively, a base station may instruct a timer to be restarted. Alternatively, a base station may set a deactivation timer to a specific value.

As another example, when configuring the data duplicate function, the base station may configure a cell in association with the second MAC entity to be in a deactivation state. When configuring (or activating) the data duplicate function, the base station may instruct one or more of cells in association with the second MAC entity to be activated. Alternatively, if a condition of the duplicate transmission is satisfied, the UE may activate one or more of cells in association with a second MAC entity.

As another example, when configuring the data duplicate function, the base station may enable a duplicate transmission activation condition to be configured for a UE. If a duplicate transmission condition is satisfied, the UE may indicate information for activating one or more of cells in association with the second MAC entity to the base station.

Hereinafter, data duplication transmission using one MAC entity will be described.

Figure 14:
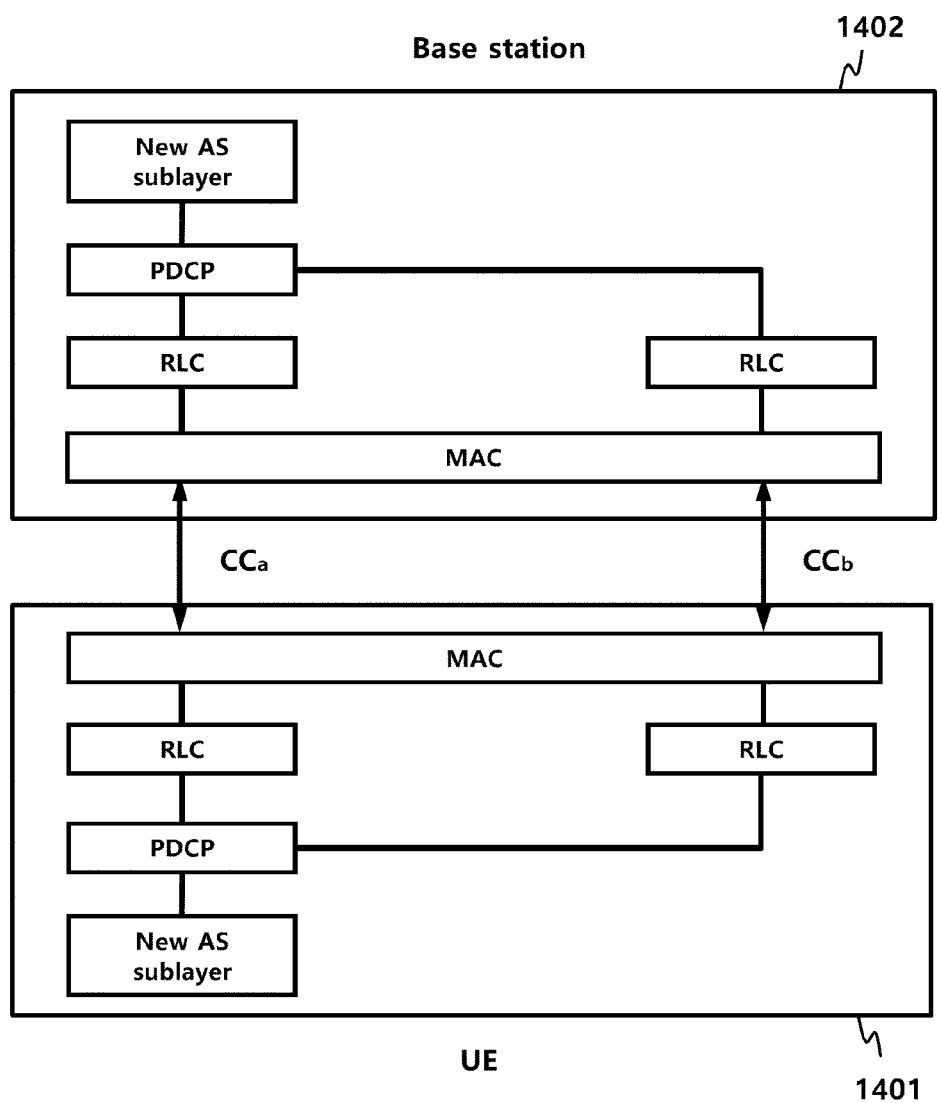
FIG. 14 is a diagram illustrating data duplicate transmission based on carrier aggregation in accordance with further another embodiment.

FIG. 14 is a diagram illustrating data duplicate transmission based on carrier aggregation in accordance with further another embodiment of the present disclosure.

Referring to FIG. 14, data may be duplicately transmitted through one or more cells/carriers provided through the CA using one MAC entity in a UE 1401. In order to transmit data duplicately through one MAC entity in the UE 1401, a base station 1402 may include one or more RLC entities and one or more logical channels associated with the one MAC entity for one radio bearer. The MAC entity may include one or more cells/carriers.

When the data duplicate function is configured, each logical channel that belongs to one radio bearer is needed to be mapped (associated or linked) to one or more cells/carriers exclusive to one another. That is, it is necessary for duplicate data from the PDCP to be transmitted through different cells/carriers from one another. Description on this will be given later.

When the data duplicate function is configured, it is necessary for at least one of cells/carriers associated with respective logical channels that belong to one radio bearer to be activated in order to perform the duplicate transmission.

For example, when configuring the data duplicate function, the base station may configure one or more of cells/carriers associated with respective logical channels that belong to one radio bearer to be in an activation state.

As another example, the base station may define and indicate one or more cells as a specific cell(s) different from other Scell(s), for one or more cells/carriers/cell groups/carrier groups not including a PCell among one or more cells/carriers/cell groups/carrier groups associated with respective logical channels that belong to one radio bearer.

As another example, when configuring the data duplicate function, the base station may configure one or more specific cells (specific secondary cell) of cells/carriers associated with respective logical channels that belong to one radio bearer to be always in an activation state.

As another example, when configuring the data duplicate function, the base station may configure one or more secondary cells associated with respective logical channels that belong to one radio bearer to be in a deactivation state. For activating the data duplicate function, the base station may activate one or more (or specific cell) of secondary cells/carriers associated with respective logical channels that belong to one radio bearer. A deactivation timer provided to a Scell may not be applicable to the corresponding cell.

As another example, when configuring the data duplicate function, the base station may configure one or more secondary cells associated with respective logical channels that belong to one radio bearer to be in a deactivation state. The base station may activate the data duplicate function only when one or more of secondary cells associated with respective logical channels that belong to one radio bearer are activated As another example, when configuring the data duplicate function, the base station may configure one or more secondary cells associated with respective logical channels that belong to one radio bearer to be in a deactivation state. When configuring (or activating) the data duplicate function, the base station may enable one or more secondary cells associated with respective logical channels that belong to one radio bearer not to be deactivated. Alternatively, a base station may instruct a timer to be restarted. Alternatively, a base station may set a deactivation timer to have a specific value.

As another example, when configuring the data duplicate function, the base station may configure one or more secondary cells associated with respective logical channels that belong to one radio bearer to be in a deactivation state. When configuring (or activating) the data duplicate function, the base station may instruct one or more secondary cells associated with respective logical channels that belong to one radio bearer to be activated. Alternatively, when a duplicate transmission condition is satisfied, the UE may activate one or more secondary cells associated with respective logical channels that belong to one radio bearer.

As another example, when configuring the data duplicate function, the base station may enable a duplicate transmission activation condition to be configured for a UE. If a duplicate transmission condition is satisfied, the UE may indicate information for activating at least one secondary cell (e.g., secondary cell(s) associated with one or more cell groups not including a PCell) associated with respective logical channels that belong to one radio bearer to the base station.

When a RLC entity is provided per one radio bearer unlike FIG. 14, data duplication transmission may be performed by combining at least one of embodiments of the present disclosure.

Hereinafter, mapping between a logical channel and a cell (carrier) will be described. Mapping between the logical channel and the cell may be applied to the embodiments and examples described above.

A traffic transmission (or routing) restriction may be imposed for each logical channel for one or more logical channels that belong to one signaling radio bearer (SRB) or data radio bearer (DRB). A logical channel configuration may indicate whether traffic for one logical channel is transmittable in specific cells.

For example, the logical channel configuration may be configured for each serving cell. As another example, the logical channel configuration may be configured for each logical channel.

For example, the logical channel configuration may be configured in the first MAC entity of the PCell. The logical channel configuration may be included in one of the first MAC entity or the second MAC entity of the SCell. A base station may include information indicating the logical channel configuration in SCell configuration information.

As another example, a cell associated with the first MAC entity may be configured to transmit traffic through only a logical channel/logical channel group associated with the first MAC entity. A cell associated with the second MAC entity may be configured to transmit traffic through only a logical channel/logical channel group configured in the second MAC entity. Joint processing of UL grant in one TTI is allowed only when servicing a logical channel with identical UL grant in each MAC entity. For UL grant for a cell that belongs to the first MAC entity, a UE performs an LCP for logical channels associated with the first MAC entity. For UL grant for a cell that belongs to the second MAC entity, a UE performs an LCP for logical channels associated with the second MAC entity.

As another example, a base station may configure one or more SCells for the duplicate transmission (for convenience of description, referred to as "second cell" or "second cell group." That is, a typical cell (PCell or SCell) based on a single base station is referred to as "first cell" or "first cell group", and a SCell added for the duplicate transmission based on a single base station is referred to as the second cell or the second cell group). When configuring the data duplicate function, the base station may configure information for instructing transmission to be performed, through the second cell or the second cell group described above, for a second logical channel added to a first logical channel for each logical channel that belongs to one radio bearer (for convenience of description, a primary logical channel mapped on a MAC entity for one radio bearer is referred to as "first logical channel", and a logical channel added the corresponding radio bearer is referred to as "secondary logical channel").

As another example, the base station may be configured to transmit the traffic of a second logical channel that belongs to one radio bearer through a second cell by including cell identification information (one or more of PCI, ServingCellindex, and SCellindex, or a cell identification information list) of the second cell for the duplicate transmission in logical channel configuration information.

For UL group for a first cell or a first cell group, the UE performs an LCP for only a logical channel transmitted to the first cell or the first cell group.

For UL group for a second cell or a second cell group, the UE performs an LCP for only a logical channel transmitted to the second cell or the second cell group.

As another example, it is possible to indicate whether transmission is available in a specific cell for each logical channel for one or more logical channels that belong to one SRB or DRB. For example, a first logical channel may be instructed to transmit through only a PCell, and a second logical channel may be instructed to transmit through the remaining cell(s)/cell group(s) (or not allow transmission through the PCell). As another example, a first logical channel may be instructed to transmit through a specific cell group including a PCell, and a secondary logical channel may be instructed to transmit through the remaining cell(s)/cell group(s) (or not allow transmission through the specific cell group including the PCell).

As another example, it is possible to instruct to transmit through only a specific cell/cell group.

Two logical channels that belong to a duplicate transmission bearer may have a cell identifier or a cell identifier list for each logical channel. A cell identifier or a cell identifier group for each logical channel may be configured so as not to overlap with one another. A cell identifier or a cell identifier group for each logical channel may be configured to be exclusive to one another.

When the data duplicate function is configured, PDCP data that belongs to one radio bearer may be needed to be transferred to cells/carriers associated with respective logical channels through one or more RLC entities.

For example, a cell group/carrier group (or second cell group) for the duplicate transmission may be defined to do this. Further, a logical channel group (or second logical channel group) mapped to this cell group may be defined. Logical channel identification information in each logical channel group may be configured independently from one another. Alternatively, a DRB in each logical channel group may have one of the values from 3 to 8. RLC entities associated with this cell group or logical channel group may be configured to be identifiable.

As another example, a logical channel group (or second logical channel group) mapped to a cell/cell group using the cell group or a carrier group (or a second cell group or a specific cell or a cell except for the specific cell) for the duplicate transmission may be defined. Logical channel identification information in each logical channel group may be configured independently from one another. Alternatively, a DRB in each logical channel group may have one of the values from 3 to 8. For this logical channel group, it is possible to include one RLC entity (second RLC entity) configuration information and one logical channel (secondary logical channel) configuration information for one radio bearer. This may be mapped through radio bearer identification information.

Duplicately transmitting RRC signaling messages or user plane data over a plurality of radio interfaces results in an additional radio resource being consumed. However, it is possible to increase reliability of control plane message transmission or user plane data transmission. Further, if a secondary base station can directly transmit an RRC message to a UE through a radio interface, it may be an advantage of transmitting rapidly data without latency of backhaul portion between base stations.

Thus, duplicate transmission through a plurality of paths improves reliability, but causes complexity and the consumption of radio resources due to the duplicate transmission. When duplicate transmission through a plurality of paths is configured to be operated continuously, there is a possibility that radio resources are excessively wasted. As an example of reducing the consumption of radio resource caused by duplicate transmission, it may use a method for indicating activation/deactivation or on/off (for convenience of description, referred to as activation/deactivation, or may be represented by various terms, such as, enable/disable, on/off, activation/deactivation, etc.) of the duplicate transmission function.

In DL RRC data duplicate transmission, a base station may transmit data by efficiently determining RRC data duplicate transmission, in the implementation of data duplicate.

For example, in case the base station sets, as an activate data, indication information for indicating whether RRC message duplicate transmission is activated or not and transmit the indication information to a UE, and when the UE generates an UL RRC message, the UE may enable a PDCP entity to transmit the corresponding RRC message through two transmission paths.

As another example, in case the base station sets, as a deactivation state, indication information for indicating whether RRC message duplicate transmission is activated and transmit the indication message to a UE, when the UE generates an UL RRC message, the UE may enable a PDCP entity to transmit the corresponding RRC message through one transmission path.

As further another example, in case the base station sets, as the deactivation state, indication information for indicating whether RRC message duplicate transmission is activated and transmit the indication information to a UE, when the UE generates an UL RRC message, the UE may enable the corresponding RRC message to be transmitted through a transmission path dedicated by a PDCP entity. The transmission path(s) to do this may be configured in advance in the UE or indicated by the base station.

When duplicate transmission through a plurality of paths is continuously operated, there is a possibility that radio resources are excessively wasted.

In DL RRC data duplicate transmission, a base station may transmit data by efficiently determining RRC data duplicate transmission, in the implementation of data duplicate.

On the other hand, in order for the UE to process efficiently UL RRC data duplicate transmission, it is necessary for the UE to enable an RRC entity or a PDCP entity to transmit an RRC message through two paths, by the control of the base station.

When duplicate transmission through two paths has been instructed, it may not be desirable to allow the duplicate transmission to be performed consecutively during corresponding RRC connection. Accordingly, the base station may set a timer for indicating duplicate transmission through a plurality of paths.

For example, the base station may indicate a duplicate transmission activation timer. When receiving an RRC message including the duplicate transmission activation timer, the UE starts the timer. When an UL RRC message is generated while the timer is running, the UE may enable the PDCP entity to transmit the RRC message through a plurality of paths, for example, two paths. When an RRC message is generated after the timer has been expired, the UE may enable the PDCP entity to transmit the RRC message through one transmission path. Such a transmission path to do this may be configured in advance in the UE or indicated by the base station. For example, this may be an RLC entity configured in default for a corresponding radio bearer. As described above, this is for convenience of description, and may be represented by various terms, such as, but not limited to, a configured RLC entity, a primary RLC entity, a default RLC entity, a first configured RLC entity, or the like.

As another example, when the duplicate transmission is activated, the base station may set a timer for deactivating the duplicate transmission. After receiving an RRC message including the timer for deactivating the duplicate transmission, the UE starts the timer when the duplicate transmission is activated depending on a specific indication or condition. When an UL RRC message is generated while the timer is running, the UE may enable the PDCP entity to transmit the RRC message through two paths. When an RRC message is generated after the timer has been expired, the UE may enable the PDCP entity to transmit the RRC message through one transmission path.

As further another example, the UE enables the timer to be restarted i) when an UL RRC message is generated while the timer for deactivating the duplicate transmission is running, ii) when the PDCP entity transmits the RRC message through two paths, or iii) when the PDCP entity processes the duplicate transmission. When an RRC message is generated after the timer has been expired, the UE may enable the PDCP entity to transmit the RRC message through one transmission path.

The base station may identify the quality state of the radio link of the UE through an RRM measurement report, CQI feedback, or the like from the UE. Accordingly, the base station may indicate activation/deactivation of duplicate transmission through lower layer information.

For example, whether data duplicate function in a PDCP entity configured in a UE is activated may be indicted through a MAC control element (CE). That is, when the duplicate transmission in the PDCP entity is configured in the UE, the base station may include indication information for indicating activation or deactivation of the data duplicate in a MAC CE and then transmit the MAC CE including indication information to the UE. The corresponding indication information may include information for indicating activation or deactivation for each data radio bearer. When the indication information indicates an activation state, the UE may duplicately transmit date through a plurality of radio paths. To do this, the PDCP entity may transfer an identical PDCP PDU to RLC entities different from one another. Indication information provided through the MAC CE to represent whether duplicate transmission operation is activated in the corresponding PDCP entity for each of one or more data radio bearers may include bitmap information for indicating an activation/deactivation state for each radio bearer corresponding to each radio bearer identifier. As another example, the base station may provide indication information for indicating an activation/deactivation state through a PDCCH. As further another example, when receiving the indication information through the MAC CE or the PDCCH, the UE may transfer the indication information to the RRC layer or the PDCP layer processing the duplicate transmission. As further another example, the base station may provide the indication information through PDCP control data.

Meanwhile, the UE may transmit indication information for indicating that duplicate transmission is to be activated/deactivated (or has been activated/deactivated) the duplicate transmission to the base station using the MAC CE or the PUCCH.

Configuration information for indicating the configuration of RRC message duplicate transmission to the UE may include condition information for activating/deactivating RRC data duplicate transmission. Alternatively, the configuration information may include switching information for instructing to switch between two data transmission paths configured through dual connectivity for RRC messages to the UE, and the switching information may include condition information for switching between data transmission paths. For convenience of description, a condition will be described as for activating duplicate transmission. A condition for instructing to switch between two data transmission paths configured through dual connectivity may also be configured to be equal or similar to that of the duplicate transmission. The corresponding condition may be included in the condition information described above.

For example, a reference radio signal quality value for activating RRC message duplicate transmission may be included in the condition information. For example, it is unnecessary for a UE to activate RRC duplicate transmission, if the radio quality of a master base station (or master TRP or master cell or PCell or anchor beam or best beam, for convenience of description, referred to as "master base station", but any transmission signal in the NR is included within the scope of the present disclosure.) satisfies (or exceeds, or equal to and greater than) a corresponding reference radio quality value. For example, if the radio quality of the master base station exceeds (or equal to and greater than) a reference value indicated by the base station, the UE may enable a PDCP entity to transmit an RRC message through one transmission path. That is, the RRC message may be transmitted through the master base station. As another example, if the radio quality of the master base station less than (or equal to and less than) a reference radio quality value, the UE may activate the RRC duplicate transmission. That is, if the radio quality of the master base station less than (or equal to and less than) a threshold value indicated by the base station, the UE may enable the PDCP entity to transmit an RRC message through two transmission paths.

As another example, the corresponding condition may be an UL data split threshold value. If data duplicate transmission is configured and data duplicate function is not in an activation state, and if the data duplicate transmission is configured but the data duplicate function is not in a deactivation state, the UE may transfer PDCP data to an RRC entity of a configured single path, when available PDCP data volume and RLC data volume associated with two RLC entities are less than the corresponding condition.

As another example, if the radio quality of a secondary base station exceeds (or equal to and greater than) a threshold value indicated by the base station, the UE may enable a PDCP entity to transmit an RRC message through one transmission path. For example, the UE may transmit the data through only the secondary base station.

As further another example, the base station may instruct the UE to transmit data through one path providing better radio quality of a master base station and a secondary base station.

As further another example, if both a master base station and a secondary base station have radio quality less than (or equals to and less than) a threshold value, the UE may enable the PDCP entity to transmit an RRC message through two transmission paths.

If a condition for activating/deactivating RRC duplicate transmission for these operations is satisfied, a physical layer may transfer this to a higher layer. For example, when the PDCP layer transmits through two transmission paths, the physical layer may indicate this to the PDCP entity. Alternatively, when the PDCP layer transmits through two transmission paths, the physical layer may indicate this to the RRC layer.

If the physical layer indicates that the corresponding condition is satisfied, the PDCP entity may activate or deactivate duplicate transmission.

To do this, the base station may indicate, to a UE, one or more of a threshold value of radio quality associated with activation/deactivation, a threshold condition (e.g., the number of times quality higher than the threshold value has been detected, the number of times quality lower than the threshold value has been detected, the number of times consecutive out of sync has occurred, the number of times consecutive in sync has occurred, an UL data split data volume threshold value, or the like), a timer for checking a threshold value condition, a time period for checking the threshold value condition, an indication condition to a higher layer, and filtering parameters. For example, to do this, an RLM procedure may be used. For another example, to this end, RRM measurement may be used. For further another example, to this end, beam measurement may be used.

The UE may monitor DL radio quality for a specific cell or all cells in a master cell group. This may be for triggering (determining/stopping/releasing/suspending) RRC duplicate transmission or PDCP data (PDCP SDU or PDCP PDU) duplicate transmission. Alternatively, the monitoring may be for indicating a state for RRC duplicate transmission or PDCP data duplicate transmission to a higher layer.

Likewise the UE may monitor DL radio quality for a specific cell or all cells in a secondary cell group. This may be for triggering (determining/stopping/releasing/suspending) RRC duplicate transmission or PDCP data (PDCP SDU or PDCP PDU) duplicate transmission. Alternatively, the monitoring may be for indicating a state for RRC duplicate transmission or PDCP data duplicate transmission to a higher layer.

If the RLM is used, the base station may set a threshold value that is indicated by the physical layer of the UE to a higher layer for performing an RLM operation. The threshold value may be a threshold value separated from a typical RLM operation.

As described above, in accordance with embodiments of the present disclosure, when the CA is configured for a UE by a single base station, duplicate transmission through different two radio paths may be efficiently performed.

Hereinafter, structures of a UE and a base station capable of performing a part or all of the embodiments and/or examples described with reference to FIG. 1 to FIG. 14 will be discussed with reference to related drawings.

Figure 15:
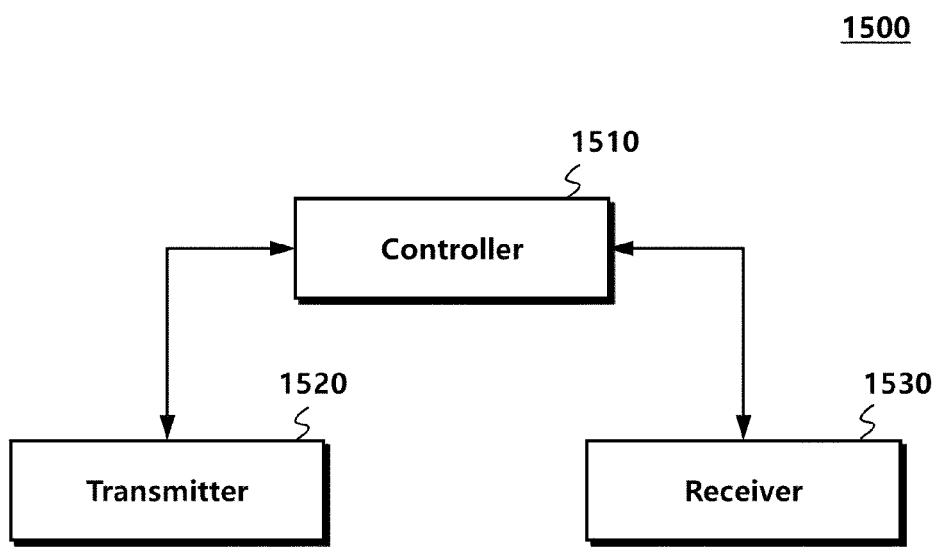
FIG. 15 is a block diagram illustrating a user equipment according to embodiments of the present disclosure.

FIG. 15 is a block diagram illustrating a UE according to embodiments of the present disclosure.

Referring to FIG. 15, a UE is provided for duplicately receiving identical control messages through carrier aggregation. The UE includes a receiver 1530 configured to duplicately receive identical control messages from a base station through a plurality of carriers, and a controller 1510 configured to process the duplicately received identical control messages by mapping the duplicately received identical control messages to different logical channels using duplication-identifying information or at least one duplication-related entity (e.g., a circuit module in the controller, sub-processor in the controller) for differently processing the duplicately received identical control messages.

For example, the controller 1510 may configure carrier aggregation using a plurality of carriers (cells) supplied by a single base station, and the receiver 1530 may duplicately receive control messages through the aggregated carriers. As an example, the receiver 1530 may receive a control message through a first cell and receive the identical control message through a second cell. There is no limitation to the number of carriers or cells aggregated for configuring the carrier aggregation.

The controller 1510 may map each of identical control messages duplicately received through different carriers to different logical channels, for processing the received identical control messages. That is, the PDCP entity of the UE 1500 may select only one of identical control messages received by being mapped to different logical channels, the other(s) of which is discarded, and then transfer the selected control message to a higher layer. To do this, it is necessary to define operation of the UE for transferring duplicately received control messages through different carriers up to the PDCP entity through different logical channels. To this end, the UE may use duplication-identifying information or at least one duplication-related entity. As described, an entity may denote a circuitry module or a processor for performing designated operations. Such a circuitry module or the processor may be independent components included in the UE or internally implemented with the controller of the UE. However, the embodiments of the present disclosure are not limited thereto. For example, such an entity may be implemented as software module for performing the designated operation in control of the controller.

For example, the controller 1510 may process duplicately received control messages using the duplication-identifying information.

As an example, the duplication-identifying information may include logical channel configuration information including two logical channel identification information mapped to one signaling radio bearer. For example, when a control message is duplicately received using the logical channel configuration information, the controller 1510 may process the received control messages using respective logical channel identification information. In this case, a MAC entity of the UE 1500 may apply predefined logical channel identification information, which is already allocated to the signaling radio bearer, to one control message, and apply one or more newly defined logical channel identification information to other one or more control messages that are duplicately received.

As another example, the MAC entity of the UE 1500 may apply predefined logical channel identification information, which is already allocated to the signaling radio bearer, to one control message, and apply one or more logical channel identification information of a data radio bearer to other one or more control messages that are duplicately received.

As further another example, the duplication-identifying information may include additional information for identifying logical channels mapped to respective control messages that are duplicately received. For example, the additional information may be included in a medium access control (MAC) PDU sub-header, or be included in an additional field or a predefined field of the MAC PDU sub-header. As another example, the additional information may be included using an additional field or a predefined field in a header or data of radio link control (RLC). As another example, the additional information may be included in one or more identifying bits that are additionally set to the logical channel identification information. For example, when the logical channel identification information is configured with 5 bits, 4 bits of the logical channel identification information that is already predefined may be maintained, and 1 bit of the 5 bits may be used as a bit indicating whether it is a duplicate control message.

The controller 1510 may process duplicately received control messages using the duplication-related entity.

As an example, the duplication-related entity may be a plurality of medium access control (MAC) entities configured to process respective identical control messages received duplicately. The plurality of MAC entities may be configured by an instruction of a base station, and may be configured for respective carriers. Therefore, duplicate control messages can be processed differently through the MAC entities.

As another example, the duplication-related entity may be a plurality of radio link control (RLC) entities configured to process the respective identical control messages received duplicately. For example, at least one of the plurality of RLC entities may be a data radio bearer RLC entity. One or more added data radio bearer RLC entities may be configured in a UE by DRB configuration information, one or more duplicate control messages may be transferred to the PDCP entity through the one or more added RLC entities.

In addition, the controller 1510 may process control messages duplicately received based on the duplication-identifying information and/or the duplication-related entity in accordance with at least one embodiment.

In addition, when the UE 1500 configures the CA based on a single base station, the controller 1510 controls overall operations of the UE 1500 for duplicately transmitting/receiving identical control message(s) through a plurality of carriers. Further, the receiver 1530 receives DL control information, data, and messages from the base station through a corresponding channel, and the transmitter 1520 transmits UL control information, data, and messages to the base station through a corresponding channel.

Figure 16:
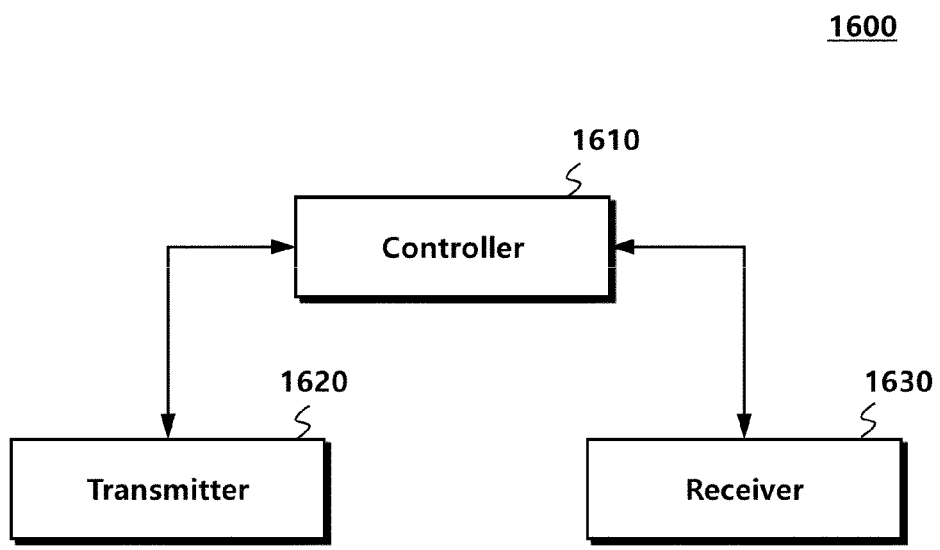
FIG. 16 is a block diagram illustrating a base station according to embodiments of the present disclosure.

FIG. 16 is a block diagram illustrating a base station according to embodiments of the present disclosure.

Referring to FIG. 16, a base station duplicately transmits an identical control message to a UE configured with carrier aggregation. The base station 1600 may include a controller 1610 configured to generate duplication-identifying information or to control at least one duplication-related entity for transmitting the identical control messages by respectfully mapping the identical control messages to different logical channels, and a transmitter 1620 configured to duplicately transmit the identical control messages to the UE using the duplication-identifying information or the at least one duplication-related entity through a plurality of carriers.

When a duplicate transmission function is configured by a base station 1600, respective logical channels that belong to one radio bearer are required to be associated with or mapped to one or more exclusive cells. That is, it is necessary for data to be duplicately transmitted from the PDCP through different cells. To do this, the base station 1600 may set or configure the duplication-identifying information or set or control the duplication-related entity, and duplicately transmit a control message to a UE through different carriers using the duplication-identifying information or the duplication-related entity.

For example, the base station 1600 may duplicately transmit control messages using the duplication-identifying information.

As an example, the duplication-identifying information may include logical channel configuration information including two logical channel identification information mapped to one signaling radio bearer. For example, when a control message is duplicately transmitted using the logical channel configuration information, the controller 1610 may process control messages using respective logical channel identification information. In this case, the base station may use predefined logical channel identification information, which is already allocated to the signaling radio bearer, to one control message, and use one or more newly defined logical channel identification information to other one or more control messages that are duplicately transmitted.

As another example, the controller 1610 may use predefined logical channel identification information, which is already allocated to the signaling radio bearer, to one control message, and use one or more logical channel identification information of a data radio bearer to other one or more control messages that are duplicately transmitted.

As further another example, the duplication-identifying information may include additional information for identifying logical channels mapped to respective control messages that are duplicately transmitted. For example, the additional information may be included in a medium access control (MAC) PDU sub-header, or be included in an additional field or a predefined field of the MAC PDU sub-header. As another example, the additional information may be included using an additional field or a predefined field in a header or data of radio link control (RLC). As another example, the additional information may be included in one or more identifying bits that are additionally set to the logical channel identification information. For example, when the logical channel identification information is configured with 5 bits, 4 bits of the logical channel identification information that is already predefined may be maintained, and 1 bit of the 5 bits may be used as a bit indicating whether it is a duplicate control message.

The controller 1610 may process duplicately received control messages using the duplication-related entity.

For example, the duplication-related entity may be a plurality of medium access control (MAC) entities configured to process an identical control message to be transmitted duplicately. The plurality of MAC entities may be configured for respective carriers.

As another example, the duplication-related entity may be a plurality of radio link control (RLC) entities configured to process the identical control message to be transmitted duplicately. For example, at least one of the plurality of RLC entities may be a data radio bearer RLC entity. The duplicate control message may be transferred to a UE through one or more added RLC entities.

The controller 1610 may process identical control messages resulted from copying in a PDCP entity using the duplication-identifying information or the duplication-related entity, and transmitter 1620 may transmit them to the UE through a plurality of carriers.

In addition, the base station 1600 may duplicately transmit a control message through in combinations with one or more embodiments of the duplication-identifying information described above and/or one or more embodiments of the duplication-related entity described above.

In addition, when the UE is configured with the CA based on a single base station, for performing embodiments described above, the controller 1610 controls overall operations of the base station 1600 for duplicately transmitting/receiving identical control message(s) through a plurality of carriers. In addition, the transmitter 1620 and the receiver 1630 are configured to transmit or receive signals, messages, data required to perform embodiments described above to or from a UE.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method for transmitting a data unit by a transmitting device, the method comprising:
   configuring a packet data convergence protocol (PDCP) entity associated with a signaling radio bearer (SRB);
   configuring a first radio link control (RLC) entity associated with the SRB and a second RLC entity associated with the SRB, the second RLC entity being different from the first RLC entity;
   configuring a single medium access control (MAC) entity associated with the first RLC entity and the second RLC entity for the SRB;
   transmitting, by the transmitting device, the data unit through the PDCP entity, one of the first RLC entity and the second RLC entity, and the single MAC entity, wherein the one of the first RLC entity and the second RLC entity is a primary RLC entity; and
   transmitting, by the transmitting device, a duplicate of the data unit through the PDCP entity, the other of the first RLC entity and the second RLC entity, and the single MAC entity,
   wherein a first logical channel mapped to the one of the first RLC entity and the second RLC entity is associated with the single MAC entity to transmit the data unit,
   wherein a second logical channel mapped to the other of the first RLC entity and the second RLC entity is associated with the single MAC entity to transmit the duplicate of the data unit,
   wherein the data unit comprises a radio resource control (RRC) message,
   wherein each of the first logical channel and the second logical channel is mapped to an exclusive carrier such that the data unit and the duplicate of the data unit are transmitted through different carriers, respectively,
   wherein the first logical channel is associated with a first logical channel identity (LCID), and the second logical channel is associated with a second LCID, and
   wherein the one of the first RLC entity and the second RLC entity is identified as the primary RLC entity based on the associated LCID being of a lesser integer value than the LCID associated with the other of the first RLC entity and the second RLC entity.

2. The method according to claim 1, further comprising: performing duplication of the data unit at the PDCP entity, wherein the data unit is a PDCP data unit.

3. The method according to claim 1, wherein the transmissions of the data unit and the duplicate of the data unit are based on a carrier aggregation (CA) duplication.

4. The method according to claim 3, wherein the CA duplication is configured by a single base station.

5. The method according to claim 3,
wherein the configured PDCP entity associated with the SRB is connected to a new access stratum (AS) sublayer, and
wherein the data unit and the duplicate of the data unit that are transmitted to the PDCP are transmitted from the new AS sublayer.

6. The method according to claim 1, wherein a value of the second LCID is received through a RRC signaling.

7. The method according to claim 6, wherein the value of the second LCID is used for both the SRB and a data radio bearer (DRB).

8. The method according to claim 1, wherein an integer value among 12 to 20 is used for the second LCID.

9. The method according to claim 1, wherein each of the first LCID and the second LCID is a value represented by 6 bits.

10. A device comprising:
a controller configured to:
configure a packet data convergence protocol (PDCP) entity associated with a signaling radio bearer (SRB);
configure a first radio link control (RLC) entity associated with the SRB and a second RLC entity associated with the SRB, the second RLC entity being different from the first RLC entity; and
configure a single medium access control (MAC) entity associated with the first RLC entity and the second RLC entity for the SRB;
transmit a data unit through the PDCP entity, one of the first RLC entity and the second RLC entity, and the single MAC entity, wherein the one of the first RLC entity and the second RLC entity is a primary RLC entity; and
transmit a duplicate of the data unit through the PDCP entity, the other of the first RLC entity and the second RLC entity, and the single MAC entity,
wherein a first logical channel mapped to the one of the first RLC entity and the second RLC entity is associated with the single MAC entity to transmit the data unit,
wherein a second logical channel mapped to the other of the first RLC entity and the second RLC entity is associated with the single MAC entity to transmit the duplicate of the data unit,
wherein the data unit comprises a radio resource control (RRC) message,
wherein each of the first logical channel and the second logical channel is mapped to an exclusive carrier such that the data unit and the duplicate of the data unit are transmitted through different carriers, respectively,
wherein the first logical channel is associated with a first logical channel identity (LCID), and the second logical channel is associated with a second LCID, and
wherein the one of the first RLC entity and the second RLC entity is identified as the primary RLC entity based on the associated LCID being of a lesser integer value than the LCID associated with the other of the first RLC entity and the second RLC entity.

11. The device according to claim 10,
wherein the controller is further configured to perform a duplication of the data unit at the PDCP entity, and
wherein the data unit is a PDCP data unit.

12. The device according to claim 10, wherein the transmissions of the data unit and the duplicate of the data unit are performed based on a carrier aggregation (CA) duplication.

13. The device according to claim 12, wherein the CA duplication is configured by a single base station.

14. The device according to claim 12,
wherein the configured PDCP entity associated with the SRB is connected to a new access stratum (AS) sublayer, and
wherein the data unit and the duplicate of the data unit that are transmitted to the PDCP are transmitted from the new AS sublayer.

15. The device according to claim 10, wherein a value of the second LCID is received through a RRC signaling.

16. The device according to claim 15, wherein the value of the second LCID is used for both the SRB and a data radio bearer (DRB).

17. A method for transmitting a data unit by a transmitting device, the method comprising:
configuring a packet data convergence protocol (PDCP) entity associated with a signaling radio bearer (SRB);
configuring a first radio link control (RLC) entity associated with the SRB and a second RLC entity associated with the SRB, the second RLC entity being different from the first RLC entity;
configuring a single medium access control (MAC) entity associated with the first RLC entity and the second RLC entity for the SRB;
transmitting, by the transmitting device, the data unit through the PDCP entity, one of the first RLC entity and the second RLC entity, and the single MAC entity, wherein the one of the first RLC entity and the second RLC entity is a primary RLC entity; and
transmitting, by the transmitting device, a duplicate of the data unit through the PDCP entity, the other of the first RLC entity and the second RLC entity, and the single MAC entity,
wherein a first logical channel mapped to the first RLC entity is associated with the single MAC entity to transmit the data unit,
wherein a second logical channel mapped to the second RLC entity is associated with the single MAC entity to transmit the duplicate of the data unit,
wherein the data unit comprises a radio resource control (RRC) message,
wherein each of the first logical channel and the second logical channel is mapped to an exclusive carrier such that the data unit and the duplicate of the data unit are transmitted through different carriers, respectively,
wherein the first logical channel is associated with a first logical channel identity (LCID), and the second logical channel is associated with a second LCID, and
wherein the first RLC entity and the second RLC entity are configured using RLC identification information, a smallest integer value of the RLC identification information indicating the primary RLC entity.

18. The device according to claim 10, wherein an integer value among 12 to 20 is used for the second LCID.

19. The device according to claim 10, wherein each of the first LCID and the second LCID is a value represented by 6 bits.

20. The method according to claim 17, wherein the RLC identification information of either of the first RLC entity and the second RLC entity is set as a value identical to a corresponding LCID.

\* \* \* \* \*